(12) United States Patent
Hansen et al.

(10) Patent No.: US 12,472,350 B2
(45) Date of Patent: Nov. 18, 2025

(54) SYSTEMS AND METHODS FOR LAPAROSCOPIC DELIVERY AND DEPLOYMENT OF A NEURAL INTERFACE

(71) Applicant: Galvani Bioelectronics Limited, Brentford (GB)

(72) Inventors: Morten Hansen, Brentford (GB); Sebastien Ouchouche, Brentford (GB); Benjamin Kreil Yaffe, Brentford (GB); Paul Matteucci, Brentford (GB); Kurtis Gross, Brentford (GB)

(73) Assignee: GALVANI BIOELECTRONICS LIMITED, Stevenage (GB)

( * ) Notice: Subject to any disclaimer, the term of this patent is extended or adjusted under 35 U.S.C. 154(b) by 678 days.

(21) Appl. No.: 17/780,228

(22) PCT Filed: Nov. 27, 2020

(86) PCT No.: PCT/GB2020/053046
§ 371 (c)(1),
(2) Date: May 26, 2022

(87) PCT Pub. No.: WO2021/105708
PCT Pub. Date: Jun. 3, 2021

(65) Prior Publication Data
US 2022/0409889 A1 Dec. 29, 2022

Related U.S. Application Data

(60) Provisional application No. 62/941,441, filed on Nov. 27, 2019.

(51) Int. Cl.
*A61N 1/05* (2006.01)

(52) U.S. Cl.
CPC ......... *A61N 1/0556* (2013.01); *A61N 1/0558* (2013.01)

(58) Field of Classification Search
CPC ........................... A61N 1/0556; A61N 1/0558
See application file for complete search history.

(56) References Cited

U.S. PATENT DOCUMENTS

| | | | |
|---|---|---|---|
| 2008/0132961 A1* | 6/2008 | Jaax | A61N 1/0551 607/2 |
| 2011/0184437 A1 | 7/2011 | Udo | |
| 2014/0228905 A1 | 8/2014 | Bolea | |
| 2017/0266436 A1 | 9/2017 | Suwito et al. | |

FOREIGN PATENT DOCUMENTS

| | | |
|---|---|---|
| CN | 105169555 A | 12/2015 |
| CN | 107072655 A | 8/2017 |
| CN | 108135585 A | 6/2018 |

(Continued)

OTHER PUBLICATIONS

International Search Report and Written Opinion for Application No. PCT/GB2020/053046, mailed on Feb. 17, 2021, 9 pages.

*Primary Examiner* — Erin Mcgrath
(74) *Attorney, Agent, or Firm* — Merchant & Gould P.C.

(57) ABSTRACT

A deployment tab for deploying a neural interface device, the deployment tab comprising a first portion configured, in use, to be positioned proximal to the neural interface device; and a connector, for releasably coupling the first portion to the neural interface device, the connector being anchored to the first portion.

26 Claims, 31 Drawing Sheets

(56) References Cited

FOREIGN PATENT DOCUMENTS

| | | | |
|---|---|---|---|
| CN | 108836501 | A | 11/2018 |
| JP | 2011152204 | A | 8/2011 |
| WO | 0069364 | A2 | 11/2000 |
| WO | 2014055408 | A1 | 4/2014 |
| WO | 2014106023 | A1 | 7/2014 |
| WO | WO-2019020985 | A1 | 1/2019 |

* cited by examiner

6mm cuff

| Percentage nerve diameter | Electrode arm opening [radial, mm] | Opening as fraction of circumference |
|---:|---:|---:|
| 100 | 0.88 | 5% |
| 105 | 1.82 | 9% |
| 110 | 2.76 | 13% |
| 115 | 3.70 | 17% |
| 120 | 4.65 | 21% |
| 125 | 5.59 | 24% |
| 130 | 6.53 | 27% |
| 135 | 7.47 | 29% |
| 140 | 8.42 | 32% |

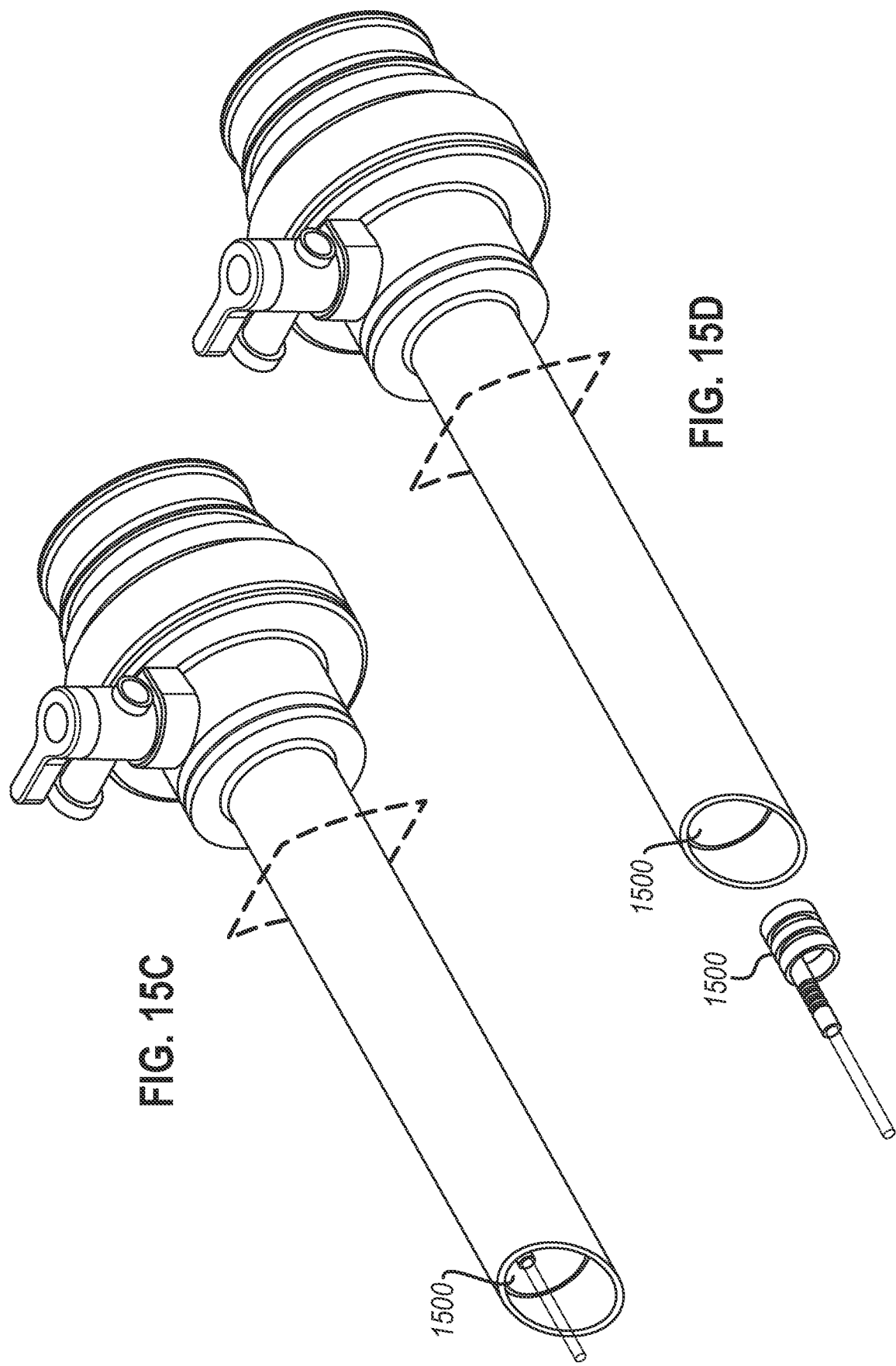

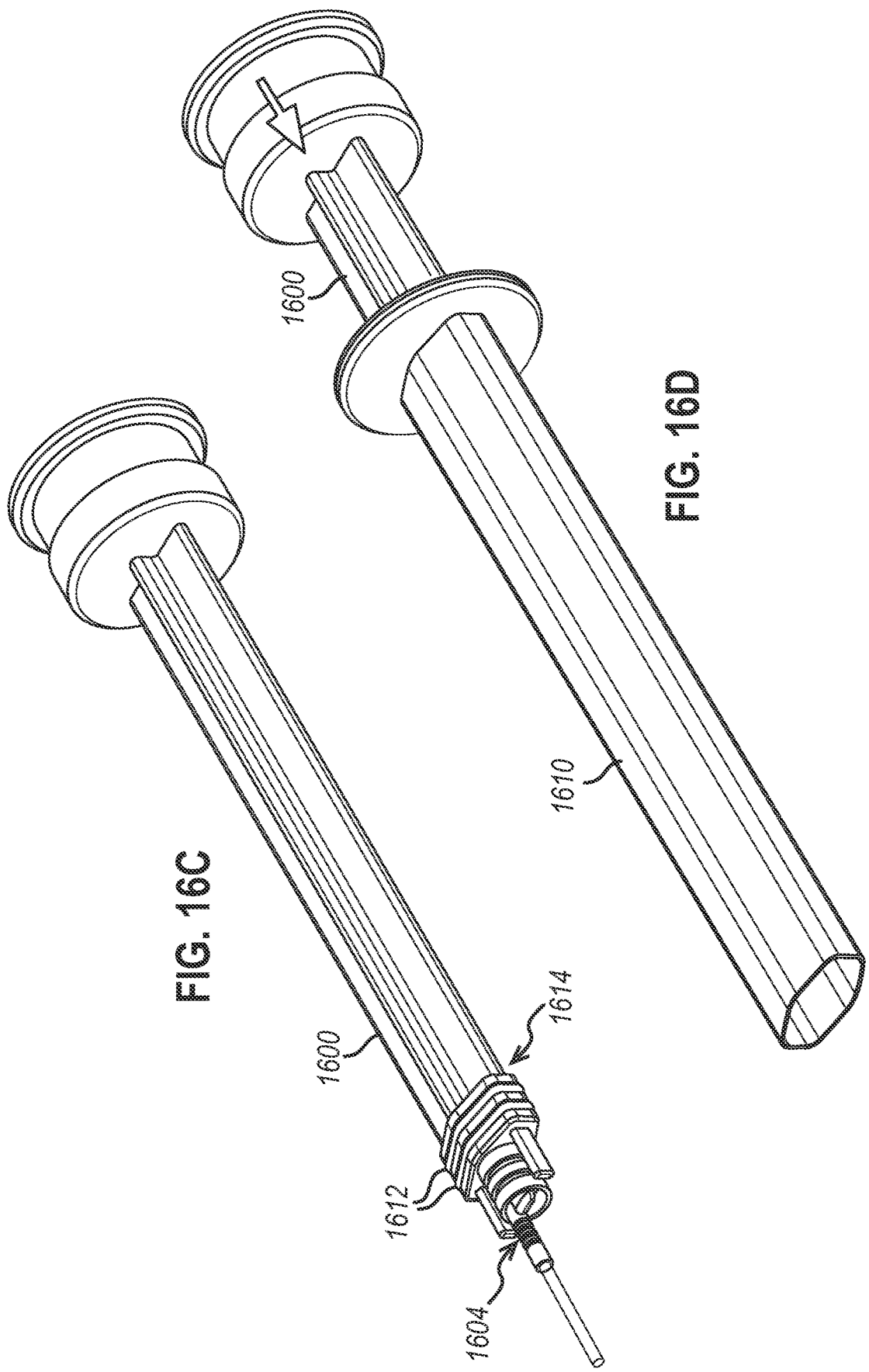

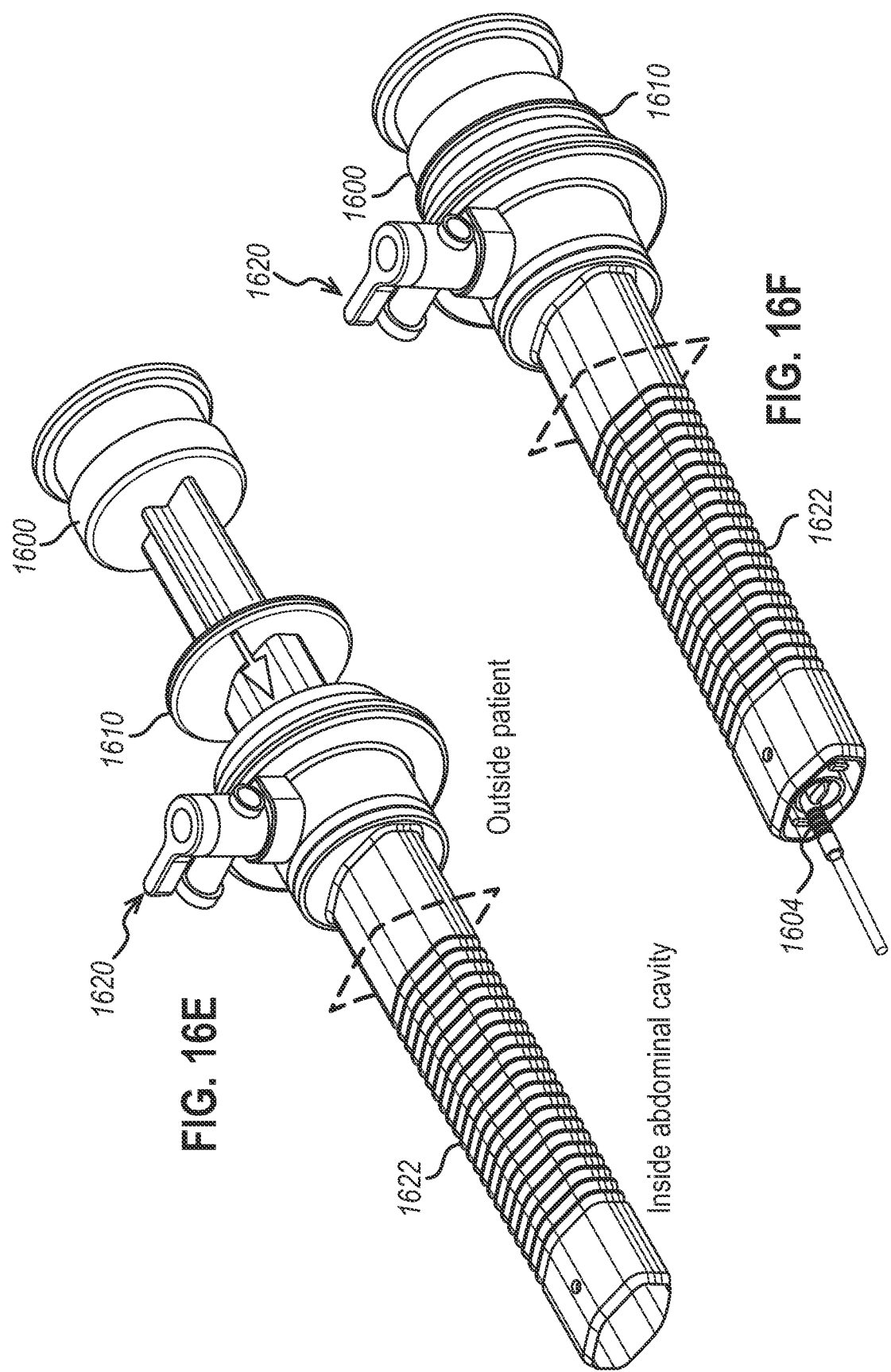

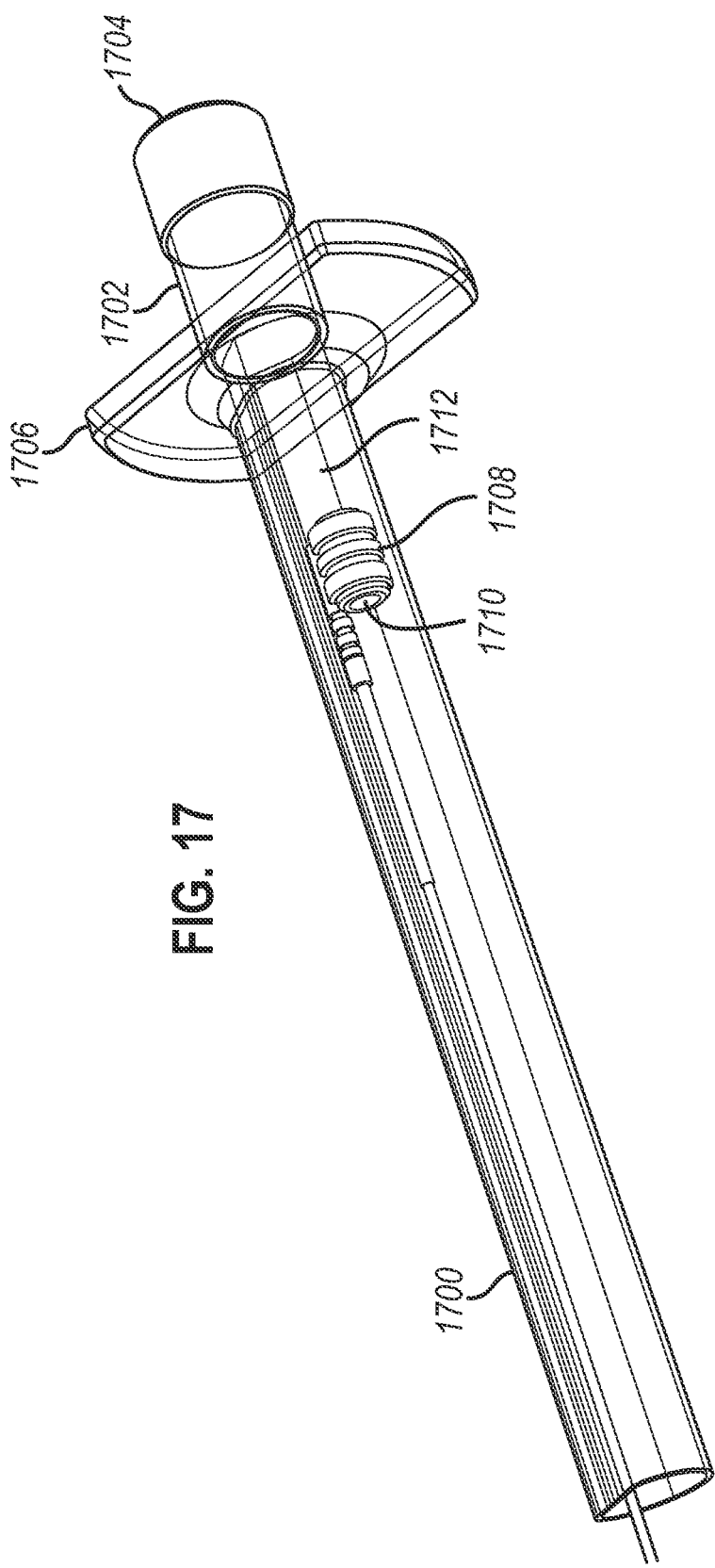

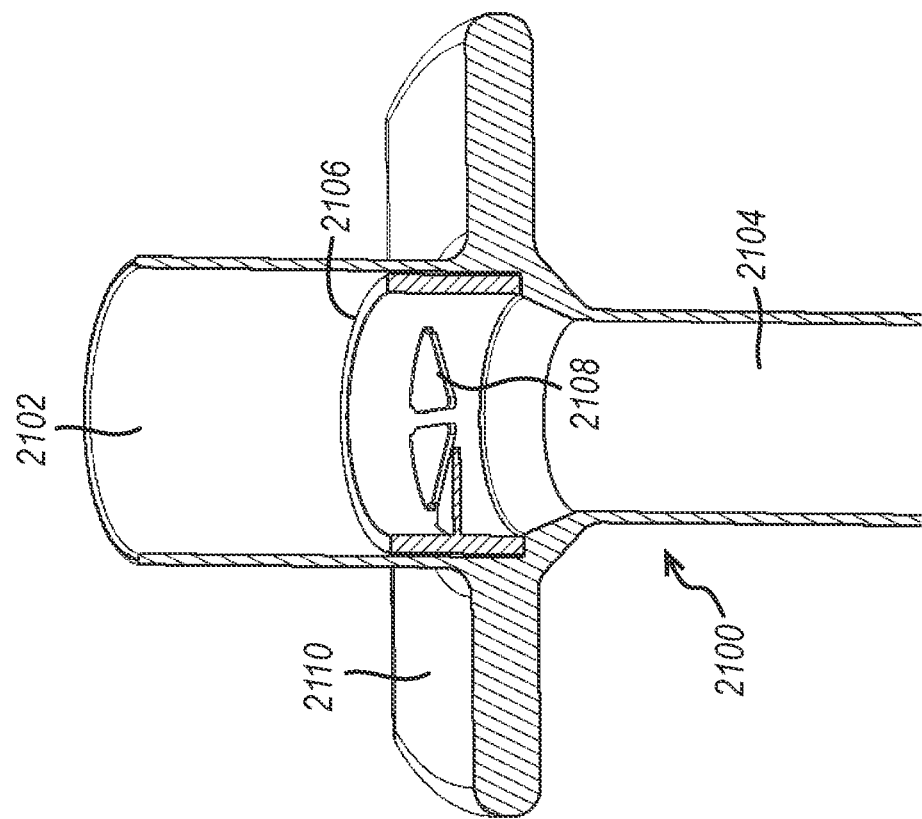
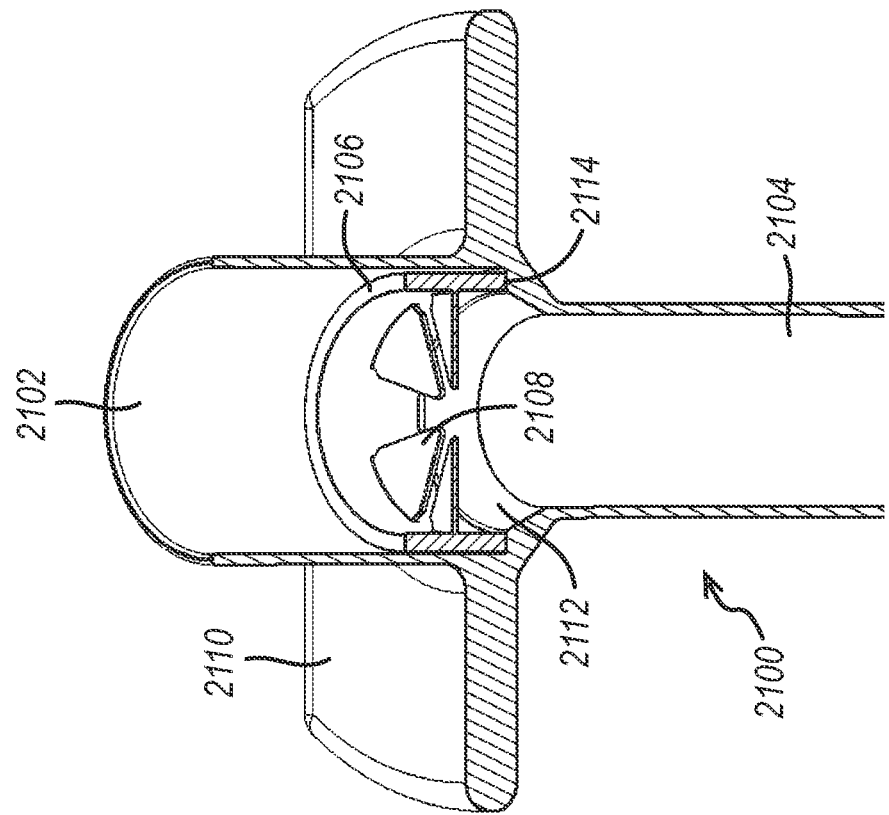

FIG. 22A
FIG. 22B
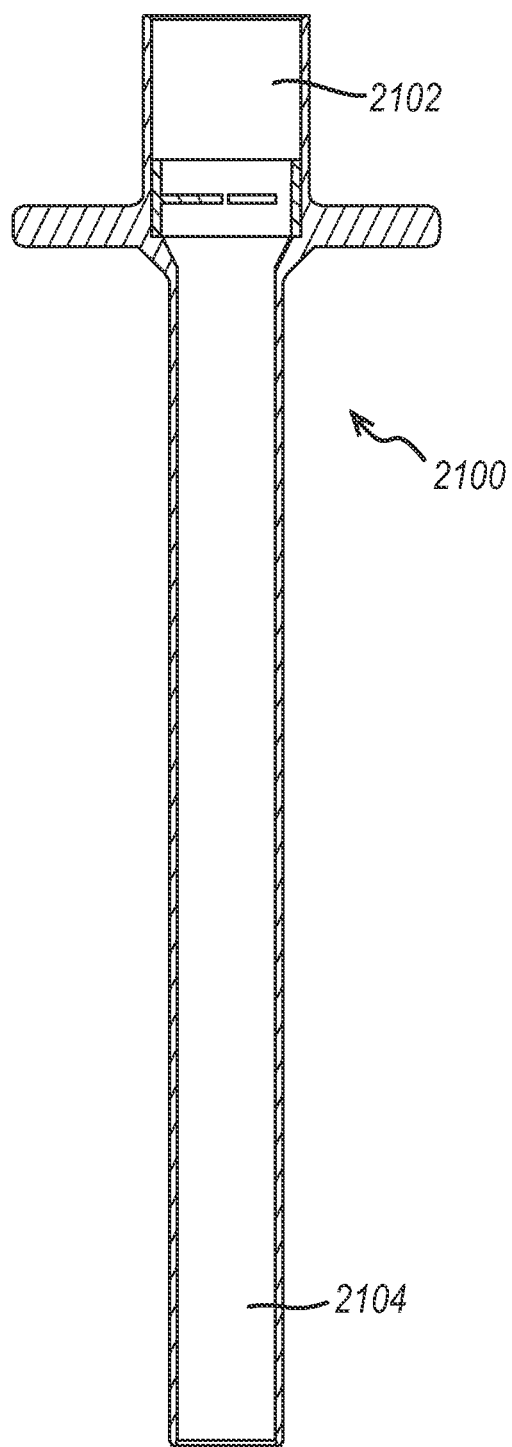
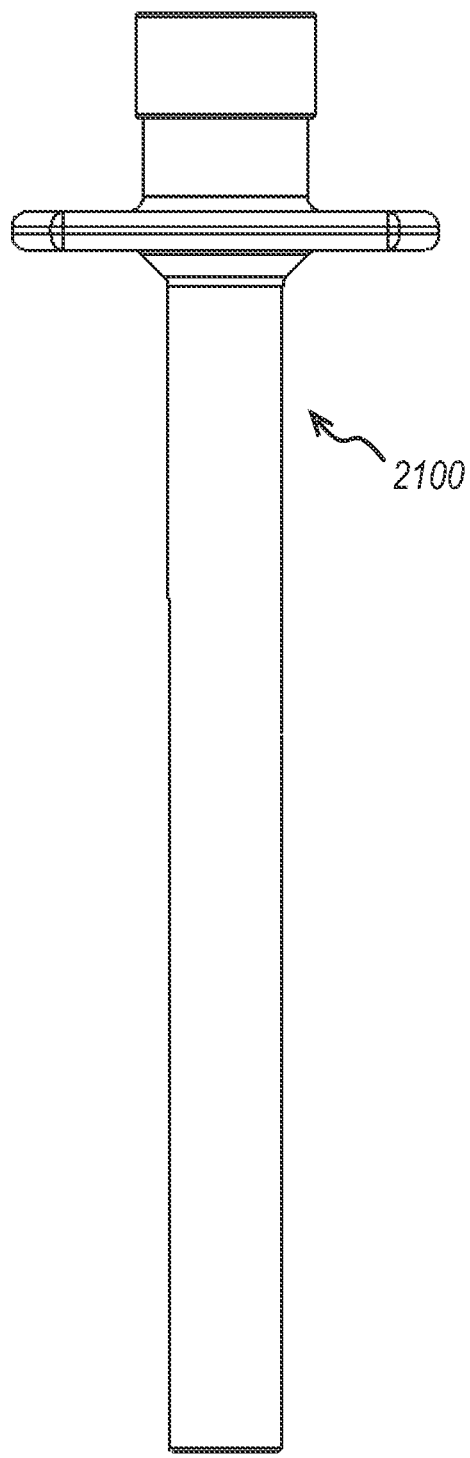

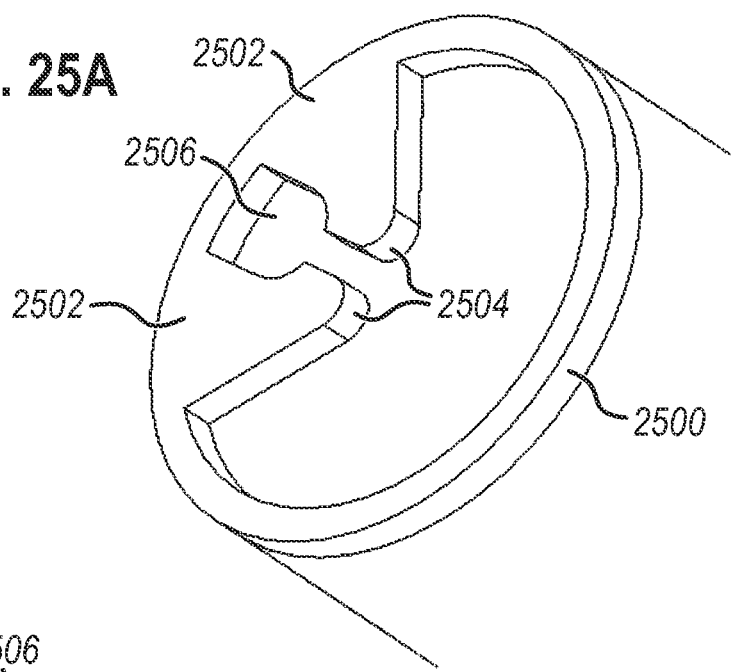
FIG. 25A
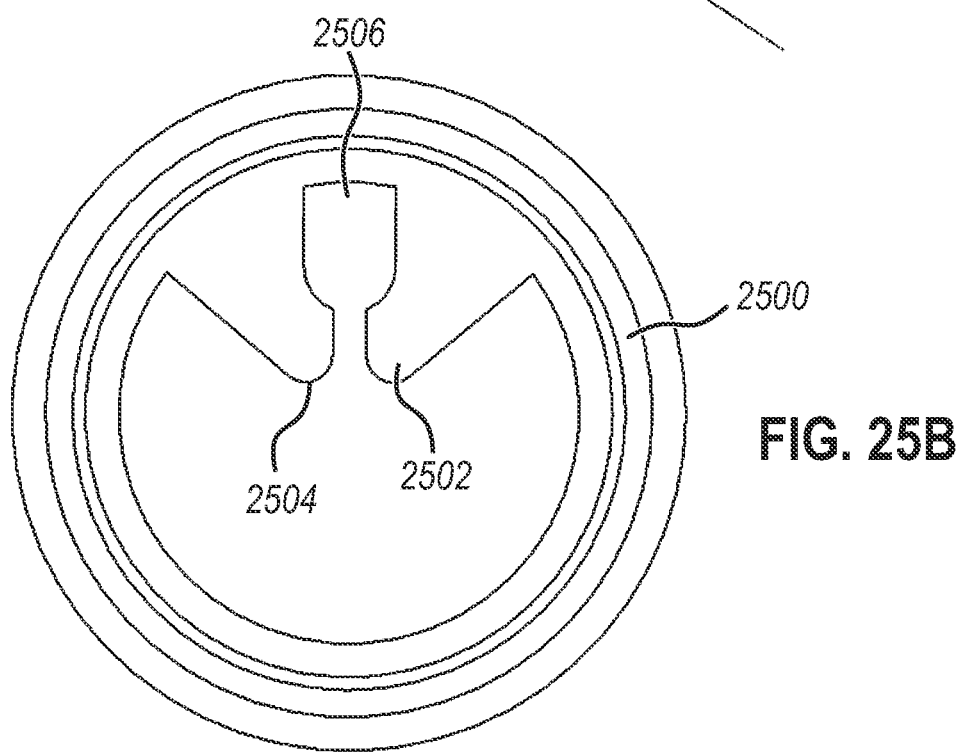
FIG. 25B
FIG. 26

SYSTEMS AND METHODS FOR LAPAROSCOPIC DELIVERY AND DEPLOYMENT OF A NEURAL INTERFACE

PRIORITY CLAIM

The present application is a National Phase entry of PCT Application No. PCT/GB2020/053046, filed Nov. 27, 2020, which claims priority from U.S. Provisional Application No. 62/941,441, filed Nov. 27, 2019, each of which is hereby fully incorporated herein by reference.

BRIEF DESCRIPTION

A deployment tab for a neural cuff is disclosed with a thickness and/or width slightly larger than the thickness and/or width of the neural cuff. The deployment tab may include an anchored suture that is wound through the deployment tab and removably attached to the neural cuff. A cut through at least a portion of the deployment tab may completely detach the deployment tool from the neural cuff. The deployment tab may include a series of transverse (or lateral, along a width of the deployment tab) ridges and valleys on one side, which may serve as a cut through guide and may enable the deployment tab to be rolled into a small size for delivery. The deployment tab may include a series of longitudinal ridges and valleys on the opposite side, which may serve to minimize or at least reduce contact surfaces (including when the deployment tab is rolled up). The deployment tab may include a tapered proximal end and be configured to operate as an instrument to check the dissection opening is large enough for the cuff (e.g. a go/no-go gauge) as well as a blunt dissection tool. If a thickness and/or width of the deployment tab will not fit through the dissection, a slightly smaller neural cuff may not easily fit through. The anchored suture is positioned within the deployment tab so that when at least a portion of the deployment tab is cut through, the suture is cut, thereby releasing the deployment tab from the pre-attached portion of the neural cuff.

BACKGROUND

Neural interfaces (or neural interface devices), such as a cuff device, comprise electrodes. There can be various challenges in delivering and deploying neural interface devices. This can be particularly the case when delivery and deployment steps are carried out laparoscopically.

For example, during deployment, sutures affixed to neural interfaces for deployment may need to be trimmed or removed. During such trimming or removal, target tissue or anatomy near the target tissue may be at risk of damage. The vestiges of sutures left after trimming may also cause damage on histology.

As another example, silicone molded nerve cuffs may rub against the sides of a deployment tube (such as a trocar) and catch. The resulting friction can cause advancement difficulties and at least portions (e.g. arms) of the neural interface may become tangled, posing risk for damaging the electrodes.

The inventors have devised various solutions to deliver and deploy neural interface devices, whilst reducing any electrode damage during such delivery and deployment.

BRIEF DESCRIPTION OF THE SEVERAL VIEWS OF THE DRAWING

FIGS. 13B-1, 13B-2 and 13B-3 are perspective views of a deployment tab.

FIGS. 13C-1, 13C-2 and 13C-3 are perspective views of a deployment tab, where the deployment tab is being used as a measurement tool.

FIG. 13C-4 is a top view of a deployment tool and a corresponding table of dimensions.

FIG. 15C is a perspective view of the delivery tool of FIG. 15A fully inserted in a trocar port in accordance with an embodiment.

FIG. 15D is a perspective view of a neural cuff being removed from the delivery tool of FIG. 15A.

FIG. 16C is a perspective view of the pusher rod with a neural cuff mounted at a distal end in accordance with an embodiment.

FIG. 16D is a perspective view of the pusher rod inserted into a delivery tube in accordance with an embodiment.

FIG. 16E is a perspective view of a pusher rod and delivery tube partly inserted into a trocar port and introduction tube in accordance with an embodiment.

FIG. 16F is a perspective view of the pusher rod and delivery tube fully inserted into a trocar port and introduction tube in accordance with an embodiment.

FIG. 17 is perspective view of a delivery tube in accordance with an embodiment.

FIG. 21A is a perspective cross-section view of one half of a neural interface retention feature of a trocar cannula in accordance with an embodiment.

FIG. 21B is a perspective cross-section view of the other half of the neural interface retention feature of FIG. 21A.

FIG. 22A is a side cross-section view of the entire trocar cannula of FIG. 21A.

FIG. 22B is a side view of the trocar cannula of FIG. 22A.

FIG. 25A is a perspective view of a neural interface retention feature in accordance with an embodiment.

FIG. 25B is an end view of the retention feature of FIG. 25A.

FIG. 26 is a side cross-section view of a neural delivery device in accordance with an embodiment.

DETAILED DESCRIPTION

Figure 1:
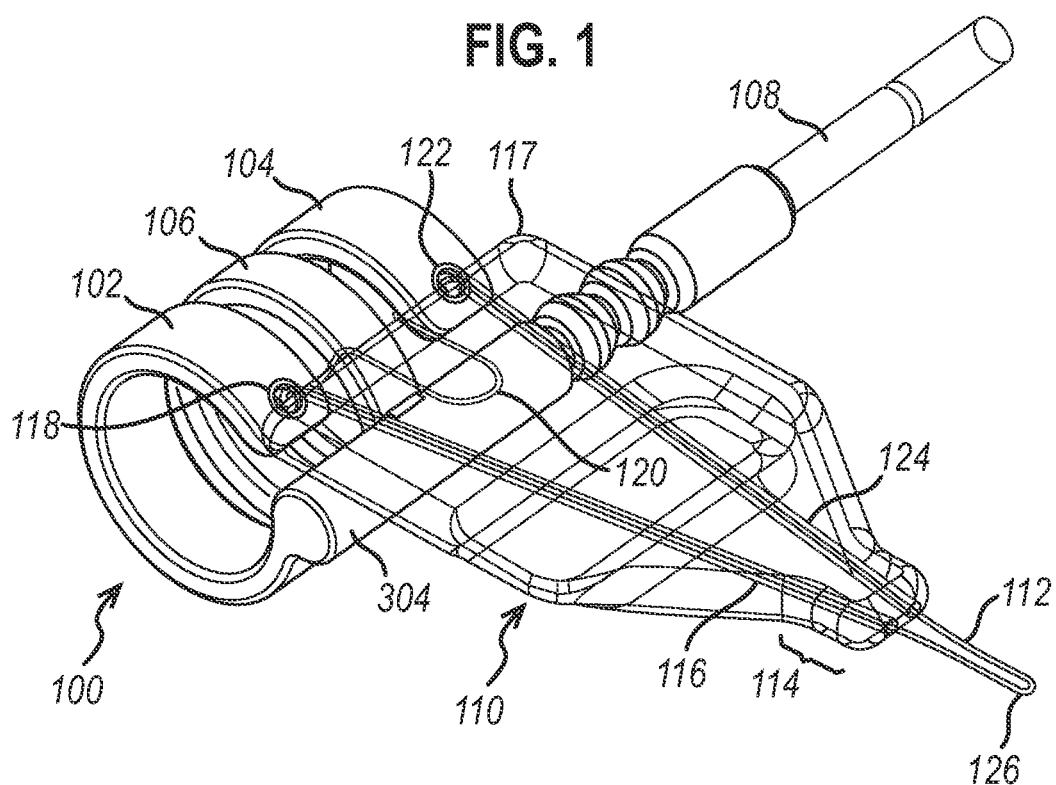
FIG. 1 is a perspective view of a deployment tab for a neural cuff in accordance with an embodiment.

The present disclosure is related to embodiments of extravascular neural interface devices containing electrodes for neuromodulation of a target, such as a neurovascular bundle or a nerve. In one embodiment, for example, a nerve cuff comprises three open ended arms, each shaped in the form of an open-ended ring (referenced herein as a "neural cuff" or "cuff"). An embodiment of such a cuff 100 is illustrated in FIG. 1. The open ends of the two outer arms 102 and 104 may be opposite the open end of the middle arm 106. In other words, the two outer arms 102 and 104 extend (or curve) in an opposite direction to the direction in which the middle arm 106 extends (or curves). The electrodes may be positioned in the two outer arms 102, 104, but can also be positioned in the middle arm 106. The molded material of the cuff and arms is typically silicone, which surrounds all of the electrodes, but an exposed surface where the electrode would make contact with target tissue. The exact nature of the electrodes is not relevant to the present disclosure and are therefore not shown, but the electrodes may be flexibly connected within the arms so that each arm can be flattened without damaging the delicate electrodes or any connections within the arms or between the electrodes and a lead body 108.

Furthermore, whilst a nerve cuff comprising three open ended arms are discussed as an example, the deployment tab or delivery tool described herein may be used to deploy or deliver other types of neural interface with different shapes or arrangements. For example, the deployment tab or delivery tool may be used where the nerve cuff comprises only one open ended arm, two open ended arms, or more than three open ended arms.

A deployment tab 110 is shown in FIG. 1. The tab 110 and the neural cuff 100 are shown as they may be positioned in a cavity of a patient when ready for positioning around a target, such as a neurovascular bundle or nerve. The tab 110 may be comprised of a base that is attached to cuff 100 by suture thread 112 (also referred to herein as a suture or suture wire) formed of a non-absorbable suture material, for example braided or monofilament polyester, nylon, polyvinylidene difluoride (PVDF) and polypropylene. The suture 112 may be either molded-in or adhered to the tab 110 to form a suture loop 120 at the time of manufacture.

The path of the suture thread 112 through the tab 110 may be explained using an end 114 of the tab 110 as a starting point. The end 114 is referred to as a proximal end 114 as it may be closer to an operator manipulating the tab 110 during a procedure. Accordingly, the distal end of the tab 110 would be the end further from the operator, which may be in contact with or be positioned proximal to the neural cuff 100. From the starting point, the suture thread 112 may movably pass through a first passage, such as a first tunnel 116 formed in the tab 110. Movably passing through a passage means that the suture thread 112 is able to move in and pass through (or slide along) the interior of the passage. A cross-sectional shape of the passage may be circular holes, oval-shaped or oblong slots, or other shapes. The first tunnel 116 runs through a central area further described below. The suture thread 112 may then exit the first tunnel 116 at a distal end 117 of the tab 110 and movably pass through a first eyelet 118 in a first outer arm 102. The eyelet 118 may be formed by a hole formed through a distal end of the outer arm (beyond the point of any electrodes positioned in the outer arm), where the proximal end of the outer arm is a spine 304 on the same axis as the lead body 108. The eyelet 118 may be circular holes, oval-shaped or oblong slots, or other shapes.

Once the suture thread 112 passes through the eyelet, it may movably pass back through an opening in tab 110 to form a suture loop 120 that is anchored to the tab 110 in some form, such as being molded in when it is formed or by an adhesive. In other words, the portion of the suture thread 112, such as the suture loop 120, which is anchored in the tab 110 is not movable and is attached to the tab 110 in a fixed manner. The suture thread 112 may extend further from the suture loop 120 to pass out of the tab 110 and then movably pass back through a second eyelet 122 in second outer arm 104, movably pass through a second passage, such as a second tunnel 124 formed in the tab 110 extending from distal end 117 of the tab to the proximal end 114 of the tab, and exit the tab 110. The two ends of the suture thread 112 may then be tied off in a knot 126. Knot 126 is depicted as a loop in order to simplify the drawing. In an embodiment, the knot 126 may serve as a grasping point for a surgical tool. It will be appreciated that whilst in this embodiment a suture loop 120 is formed so that a single suture thread 112 is used, two separate suture threads 112 may be used such that each suture thread 112 passes through different channels and are anchored in the tab 110 separately.

As would be understood by the skilled person, the length of a deployment tab would be measured from the side of the tab which is connected to the cuff to the knot 126 on the opposite end of the tab (i.e. from the distal to proximal end of the tab). Similarly, the width of the deployment tab can be understood as the widest portion of the tab, in a direction transverse to the length above (in an axis parallel with the axis cutting through the two eyelets 118, 122 of the cuff).

Figure 2:
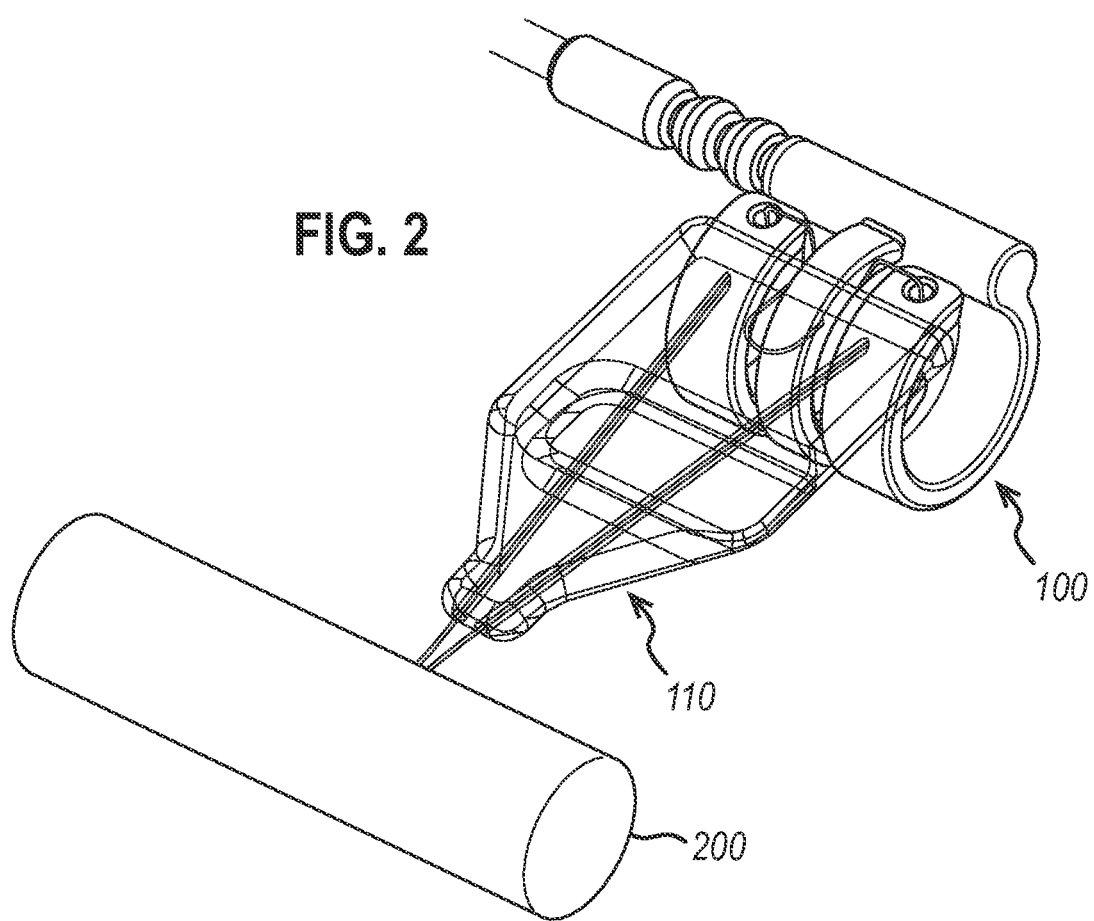
FIG. 2 is a perspective view of a deployment tab of FIG. 1 sutured to a neural cuff and positioned for deployment around a target in accordance with an embodiment.

FIG. 2 illustrates the tab 110 and cuff 100 being positioned proximal to a target 200 for deployment. In the embodiment illustrated in FIG. 2, the target 200 may be a neurovascular bundle, although cuff 100 may also be used on nerves that do not include vessels. For ease of reference herein, however, target 200 will be referred to as target tissue 200. Spacing between the positions of the two tunnels relative to the outer arms of the cuff may also serve to keep the outer arms properly positioned when pulled under the target tissue. Furthermore, as the spacing is provided by the presence of a portion of the tab, further structural stability is provided when manipulating the cuff.

Figure 3:
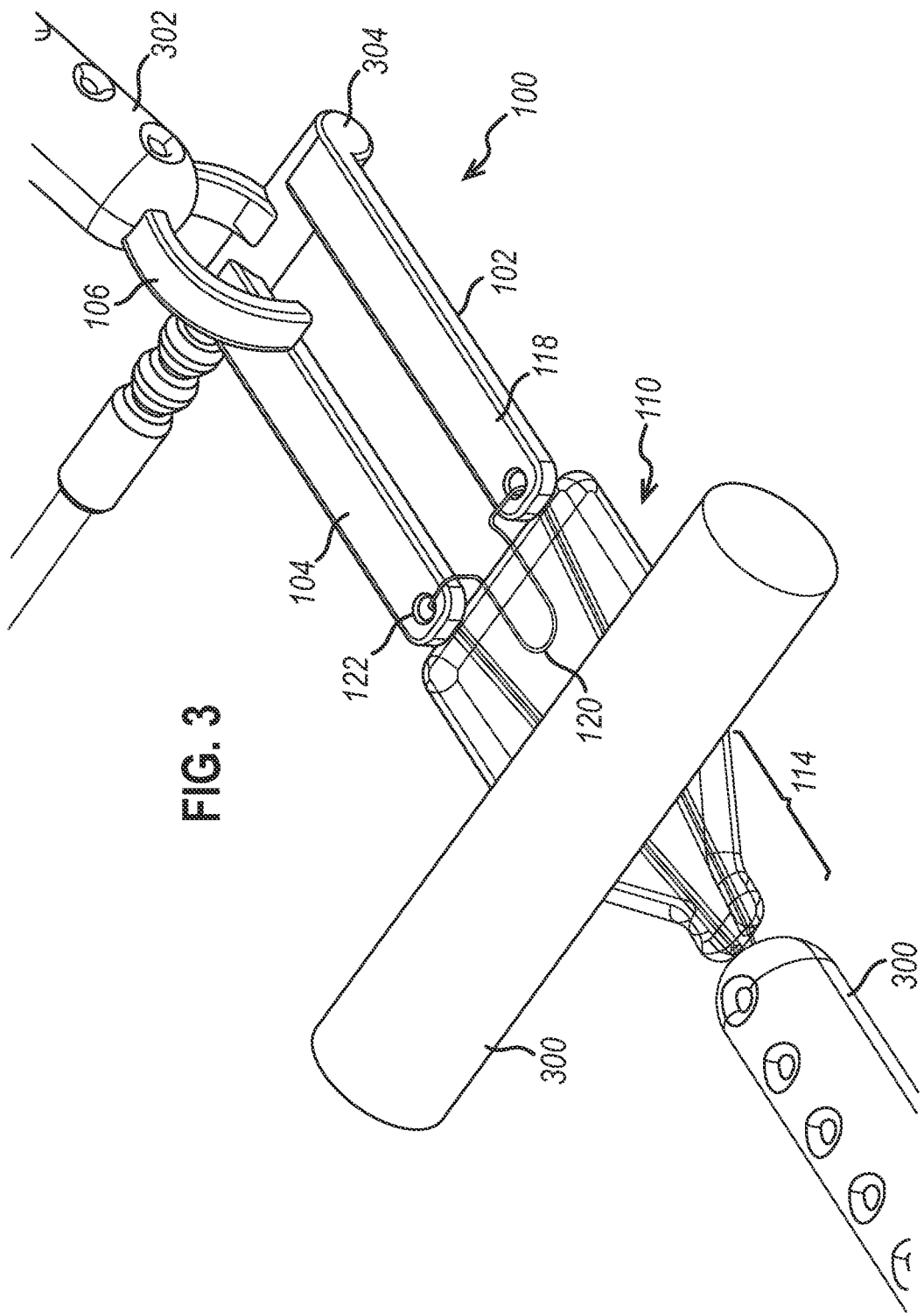
FIG. 3 is a perspective view of the deployment tab of FIG. 1 being used to pull open the neural cuff and the deployment tab is pulled under the target in accordance with an embodiment.

As illustrated in FIG. 3, a first surgical tool 300 may be used to dissect or separate an area under the target tissue 200 and grasp the suture knot 126 or the proximal end 114 (closest to the surgical tool 300) of the tab 110 and pull the proximal end 114 of the tab 110 under the target tissue 200. A second surgical tool 302 may also be used to grasp a portion of the middle arm 106 of the cuff 100 in order to create counter traction between the arms of the cuff 100. As the tab 110 is pulled under the target tissue 200, a tapering of the proximal end 114 may help to further dissect tissue under the target tissue 200 as needed. The tapered proximal end 114 may be at least in part triangularly shaped. As illustrated in FIG. 3, the proximal end 114 may taper from a wider central portion of the tab 110 to a narrower portion near the suture knot 126. Between the first surgical tool 300 pulling on the suture knot 126 or the proximal end 114 and the suture loop 120 being anchored within the tab 110, sufficient pulling pressure may be exerted on the outer arms 102 and 104 by the second surgical tool 302 to pull the outer arms 102 and 104 away from the spine 304 of the cuff 100.

Figure 4:
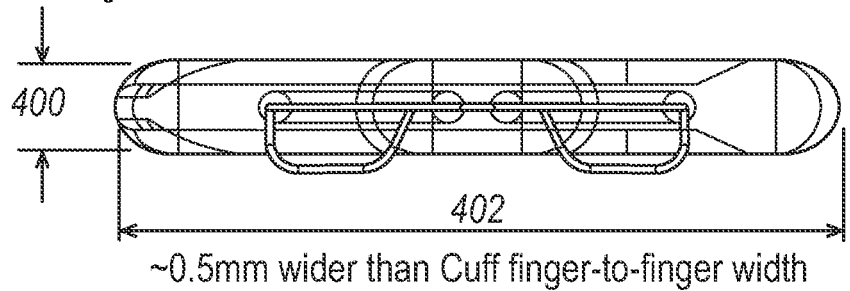
FIG. 4 is distal end view of the deployment tab of FIG. 1 in accordance with an embodiment.

As further illustrated in FIG. 4, the tab 110 may also perform as a go/no-go indicator during deployment. The thickness 400 of the tab 110 may be greater than the thickness of any of the cuff arms 102, 104 or 106. In an embodiment, the tab may be approximately 0.5 mm thicker than the cuff arms. The width 402 of the tab 110 may also be greater than a width the cuff 100 as measured from the outside of the outer cuff arms 102 and 104, which are deployed around the target tissue 200. In an embodiment, the width of the tab may be approximately 0.5 mm greater than the width the cuff deployed around the target tissue to account for tissue compliance. In other embodiments, the tab may be thicker or wider than the cuff by, for example, approximately 0.5-2 mm. The difference between the sizes of the tab and the neural interface is based on tissue compliance of the target tissue. The differential thickness and width of the tab 110 serves as a go/no-go feature because as the tab 110 is pulled through the dissection, if the tab 110 cannot be pulled through without causing tissue damage, then the cuff 100 cannot be safely deployed. Removing the tab 110 partway through deployment will result in less tissue damage and potential damage to the target tissue 200 than will result from attempting to push or pull the cuff 100 into place, with the arms at least partly deployed around the target tissue 200, only to find there is insufficient room for the cuff and the arms have to be pulled away from the target tissue.

Figure 5:
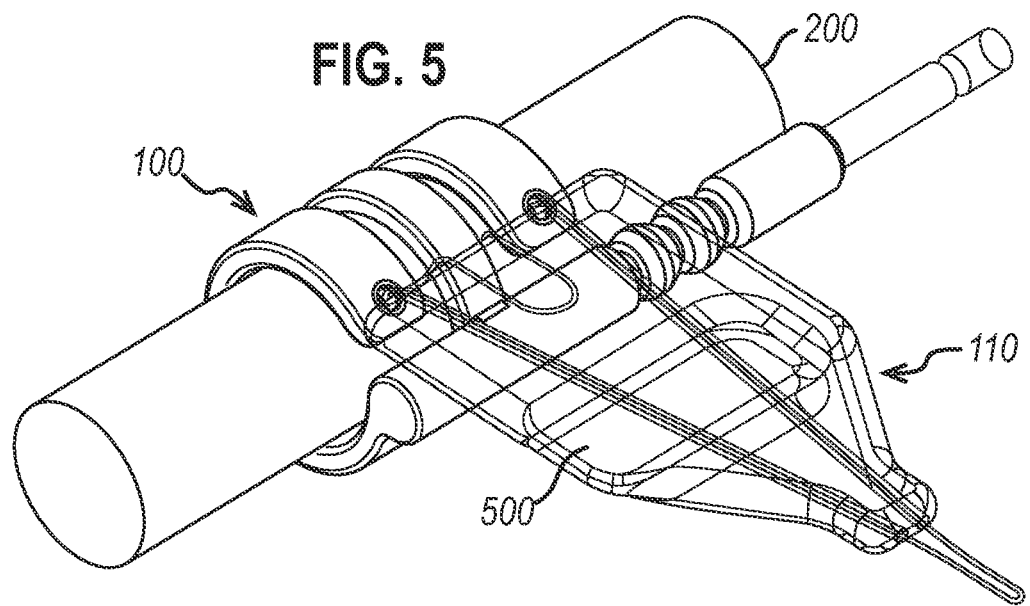
FIG. 5 is a perspective view of the neural cuff deployed of FIG. 1 around the target prior to release of the deployment tab in accordance with an embodiment.
Figure 6:
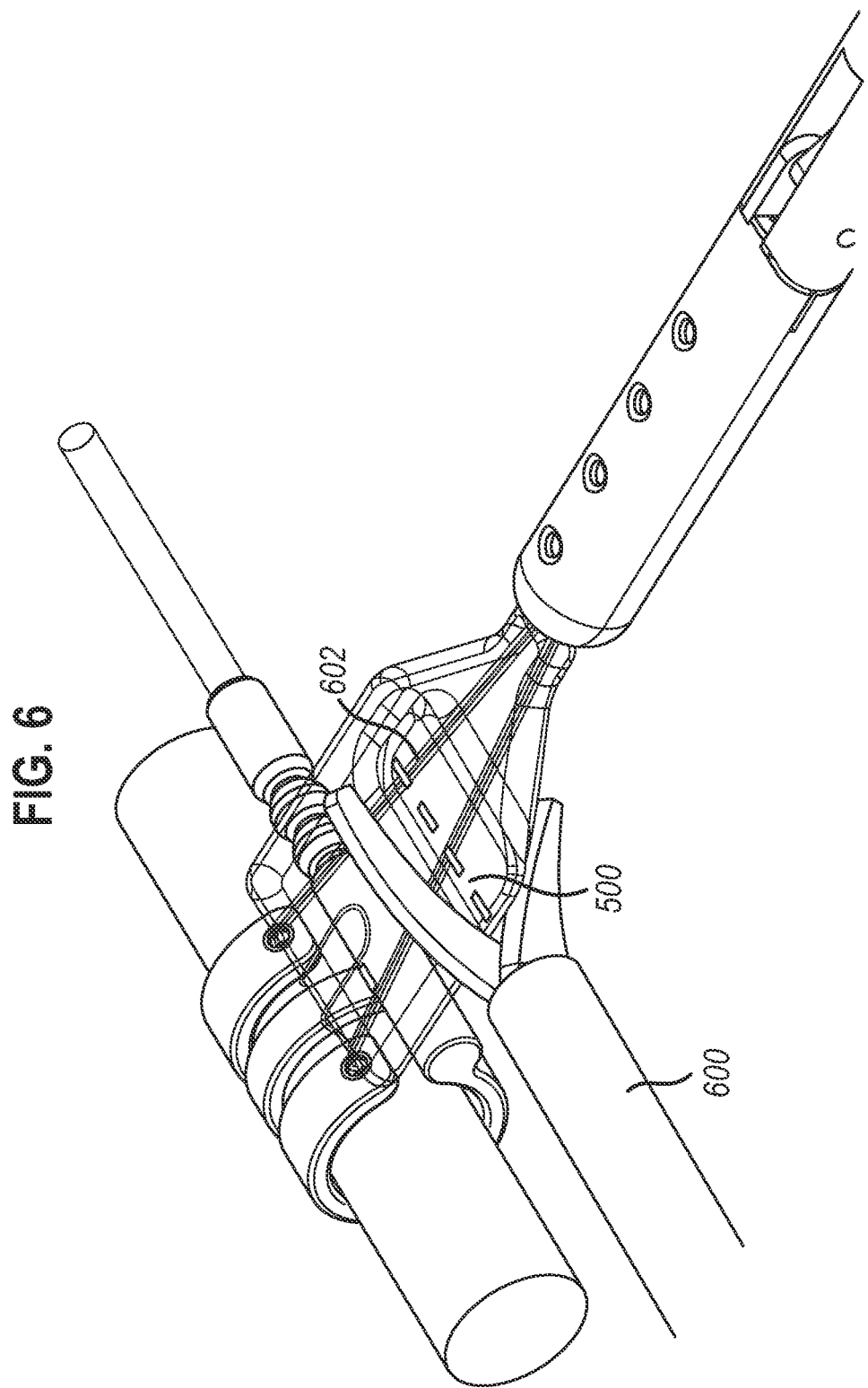
FIG. 6 is a perspective view of the deployment tab of FIG. 1 being cut to release the suture thread in accordance with an embodiment.
Figure 7:
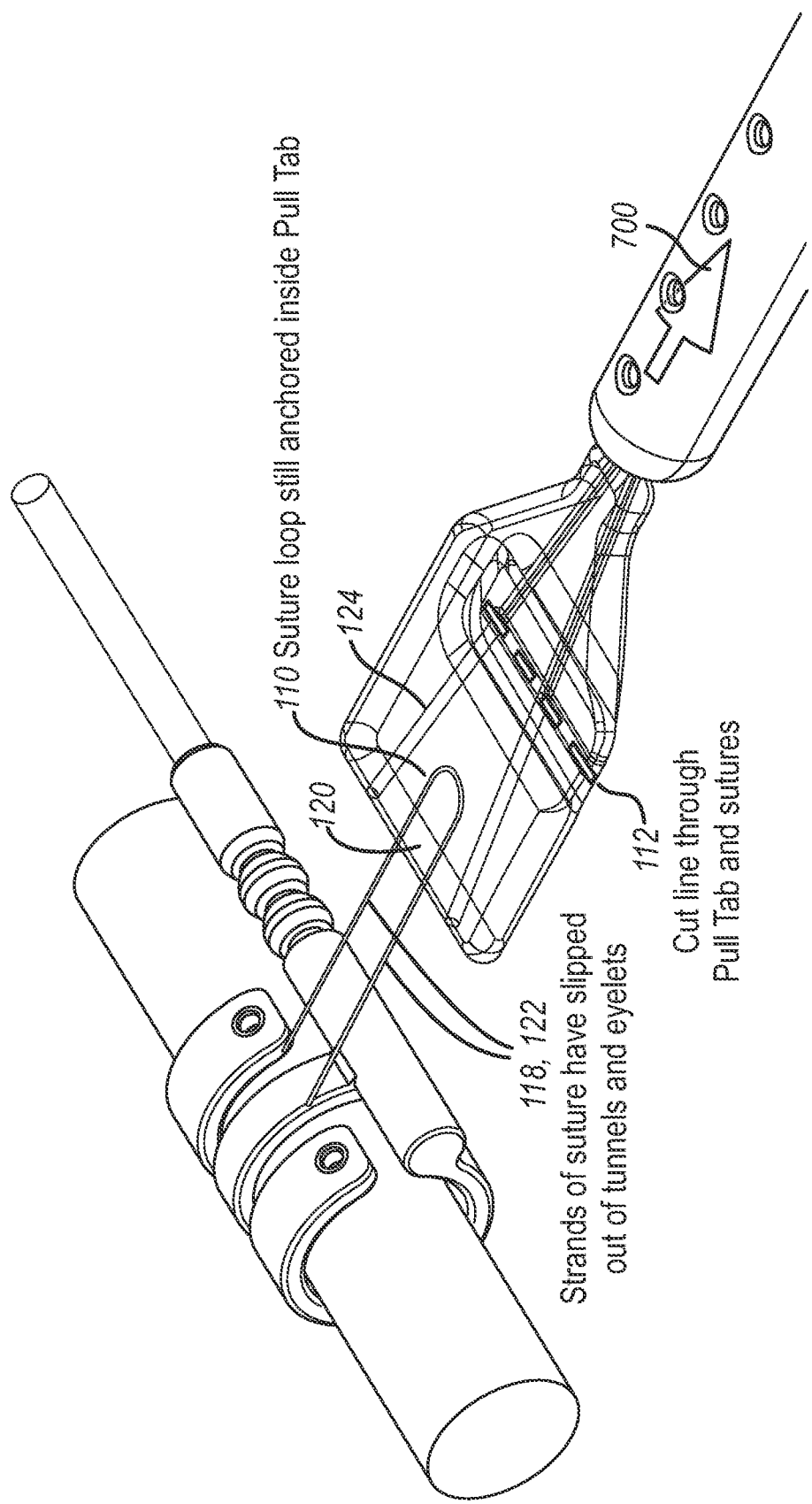
FIG. 7 is a perspective view of the deployment tab of FIG. 1 being pulled away from the neural cuff in accordance with an embodiment.

Once the cuff 100 has been positioned at the target tissue 200 and the unfurled arms 102, 104 and 106 have been released so that they may wrap around the target tissue, as shown in FIG. 5, it is necessary to safely and completely remove the tab 110 and the suture thread 112 from the cuff 100. Safe and complete removal of the tab 110 and the suture thread 112 can be completed by partly cutting through the tab at one or more positions in the central area, each of which are a safe distance from the target tissue 200. As illustrated in FIGS. 5 and 6, the cutting position in the central area may be indicated by a cutting window 500, such as a depressed area in the tab 110 that a surgeon can readily identify during deployment. Cutting through the tab 110 at the cutting window 500 with a cutting tool 600 along the length of the dashed line 602 will result in the suture thread 112 within both tunnels 116 and 124 (as shown in FIG. 1) being cut through. For example, as shown in FIG. 7, the suture loop 120 is anchored inside the tab 110 about a third of the length of the tab 110 from the distal end of the tab 110. As such, the suture loop 120 does not extend within the tab 110 as far as the cutting window 500. Accordingly, cutting the suture thread 112 at the cutting window 500 will allow strands of the suture thread 112 inside the tunnels to be released, but the suture thread 112 that is part of the suture loop 120 will remain.

Figure 8:
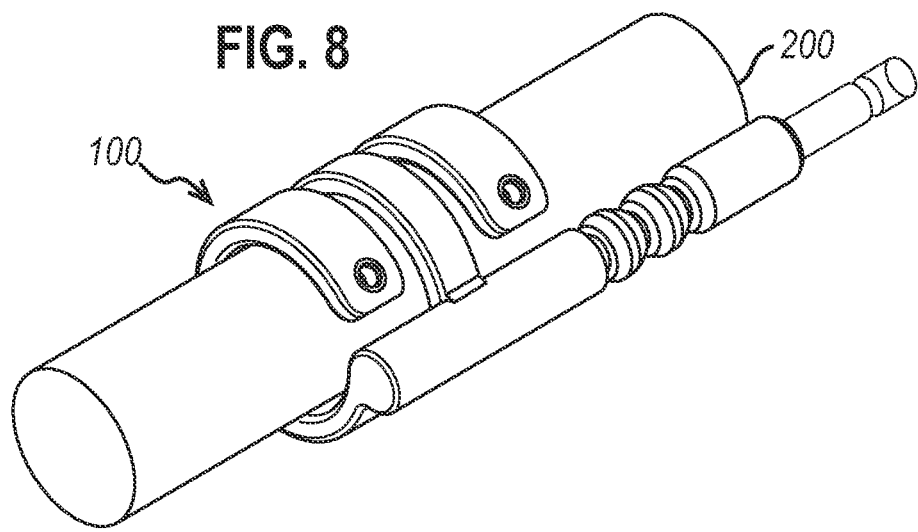
FIG. 8 is a perspective view of the fully deployed neural cuff in accordance with an embodiment.

The released strands of the suture thread 112 can then be pulled out of the eyelets 118 and 122 as the tab 110 is completely and safely pulled away from the cuff 100 in the direction of arrow 700. In addition to removing the tab 110, all of the suture thread is completely pulled away from the cuff 100 when the tab 110 is removed as ends of the strands of the suture thread are still molded into or adhered to the tab 110 at the suture loop 120. The fully deployed cuff 100 around target tissue 200 is illustrated in FIG. 8.

Figure 9:
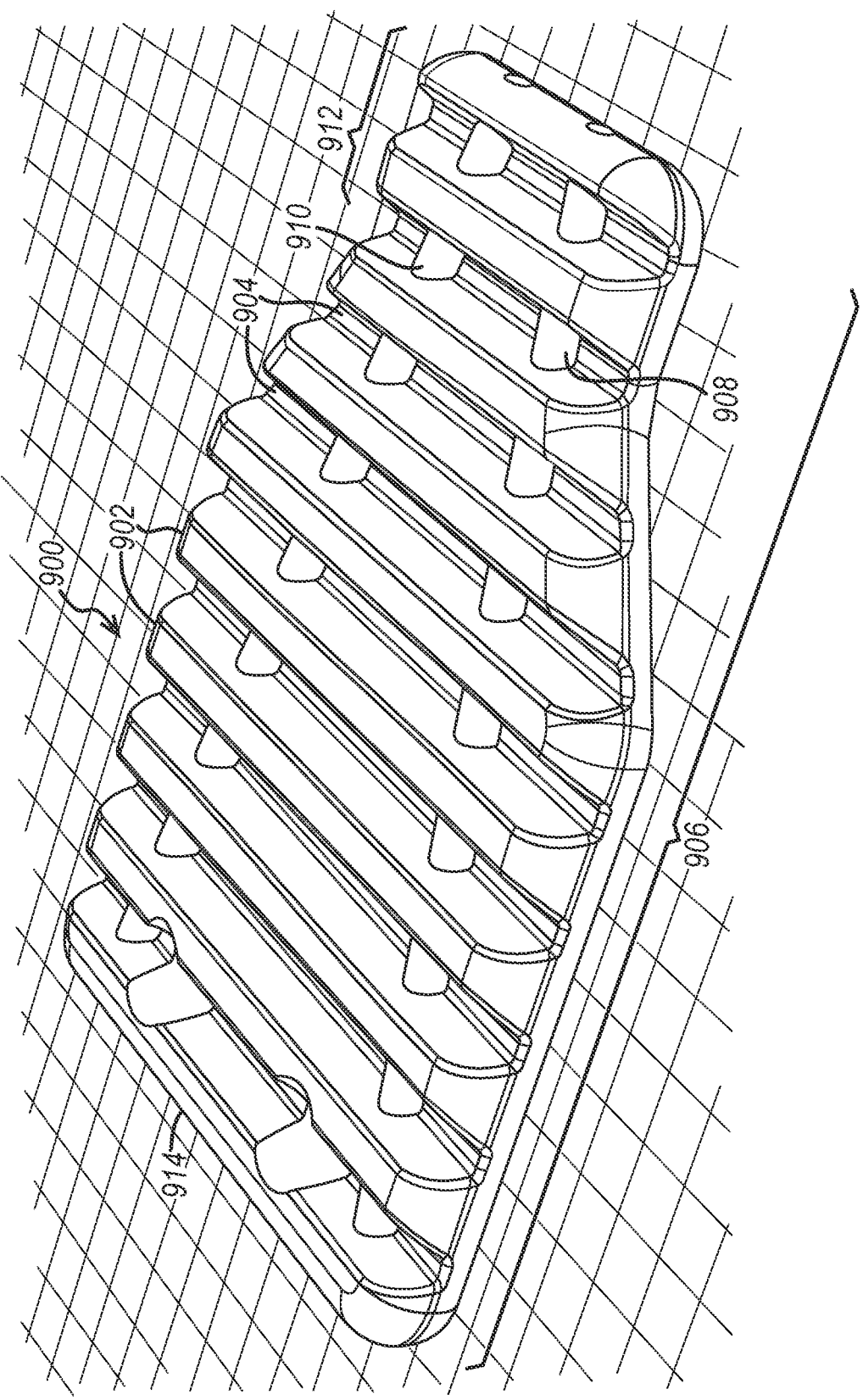
FIG. 9 is a perspective view of an embodiment of a deployment tab having a series of lateral ridges and valleys.

A further embodiment of the tab 900 is illustrated in FIG. 9. In this embodiment, the tab 900 includes a series of ridges 902 (which may also be referred to as ridges or protrusions) and valleys 904 (which may also be referred to as depressions) that may extend substantially orthogonal to the length 906 (i.e., along a width of the tab) of one side of the tab 900. Within each valley 904, tunnels 908 and 910 are exposed such that the tunnels shift between being a tunnel through a ridge 902 and a pipe through valleys 904. The passages 908, 910 may be substantially the same as tunnels 116, 124 of tab 110 in that the suture thread 112 (not shown in FIG. 9) may movably pass through each passage 908, 910 from the tapered proximal end 912 (closest to the operator or surgical tool) to the cuff arms positioned at distal end 914. Where passages 908, 910 may pass through a ridge 902, the passage would be a tunnel, and where the passages pass through a valley, the passage would be a pipe. Cutting through any one of the valleys 904 far enough across (in some embodiments the tab is cut in two completely, and in some embodiments the cut is made just far enough across without cutting the tab 110 in two) to cut through both passages 908, 910 will release the suture thread without completely cutting through the tab 900, thereby allowing the tab 900 to be completely removed along with all of the suture thread. By cutting through a valley 904 and the tunnels of the passage 908, 910 at a point close to the point where the bottom of a ridge 902 meets the valley 904 may reduce the sharpness of the resulting corners and edges that may be created, thereby minimizing potential tissue irritation during removal.

In other embodiments, the deployment tab 900 may be cut closer to a first area closer to the neural interface, for example the tapered proximal end 912. The tapering means a narrower width which means fewer cuts are required to cut through a required portion of the deployment tab 900.

Figure 10:
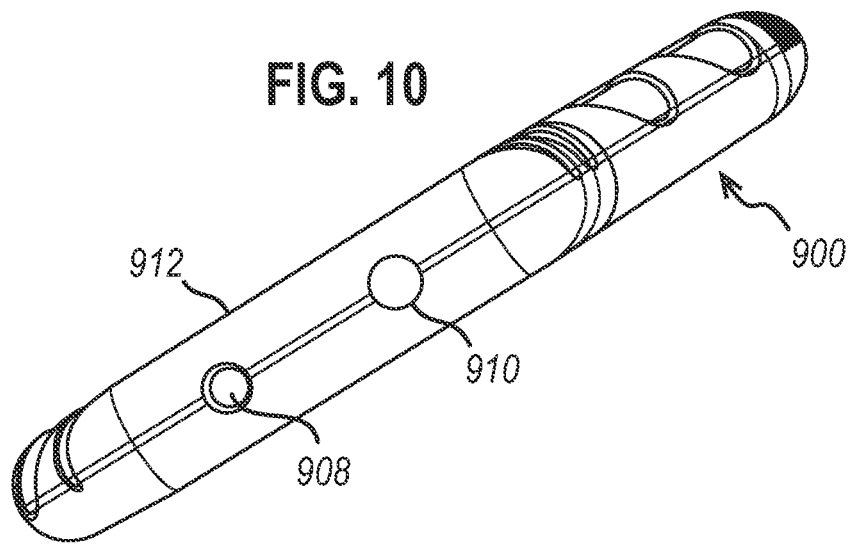
FIG. 10 is a proximal end view of the deployment tab of FIG. 9.

The positions of the passages 908, 910 relative to the proximal end 912 of the tab 900 are further illustrated in FIG. 10. Tab 900 has similar thickness and width dimensions to tab 110 and tapering, which allows the tab 900 to provide a similar go/no-go feature and to assist with dissection, respectively. However, the ridges and valleys may make it possible to roll tab 900 up into a smaller space which may make it more suitable for insertion into small cuffs, as further described below. In other words, the lateral ridges and lateral valleys may provide longitudinal flexibility that may enable the deployment tab to be rolled up while providing lateral stiffness when the deployment tab is unrolled.

Figure 11:
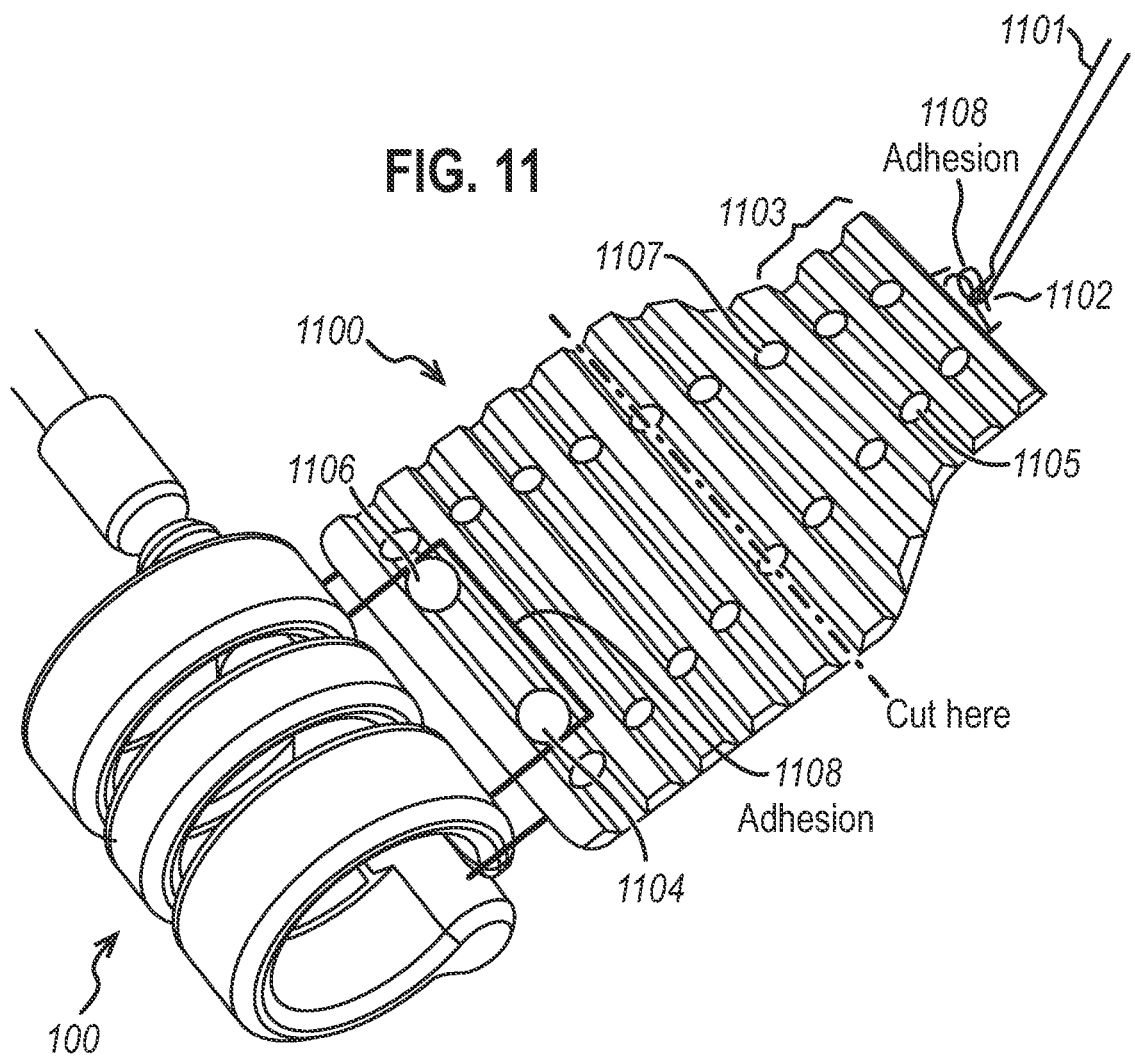
FIG. 11 is a perspective view of the deployment tab of FIG. 9 sutured to a neural cuff in accordance with an embodiment.

FIG. 11 illustrates an embodiment of a tab 1100 where the suture loop is not anchored within the tab 1100 but is rather adhered to the outside of the tab 1100. For example, the suture thread 1101 may pass from the suture knot 1102 at the proximal end 1103 and through the passages 1105, 1107 to the eyelets (not shown) of the cuff 100. After passing through the eyelets of the cuff 100, the suture thread 1101 may return to the tab 1100 and pass extensions/openings 1104, 1106 where the suture would be adhered to the tab 1100. In the embodiment of the tab 1100, the suture thread 1101 may be adhered (not molded) to the tab 1100. Small extensions or openings 1104, 1106 may be formed on or in the distal end of the tab 1100 so that adhesive 1108, such as a silicone adhesive, can be applied to the suture thread 1101 to secure it to the tab 1100. If openings 1104, 1106 are utilized, the suture thread 1101 may be inserted into the openings 1104, 1106 before adhesive is applied to hold the suture thread 1101 in place. If extensions 1104, 1106 are utilized, the suture thread 1101 may be at least partially wrapped around the extensions before adhesive is applied to further hold the suture thread 1101 in place. Adhesion (or adhesive) 1108 may also be applied at the suture knot 1102 to further secure the suture thread 1101 to the proximal end 1103 of tab 11000. It will also be appreciated that the suture thread may be adhered (rather than molded) to the tab 1100 described above.

The utilization of ridges and valleys to expose the suture tunnels in tabs 900 and 1100 in the central area may provide a surgeon with more options than a single cutting window as to where the tab can be cut for removal. As the tubes are visible within the valleys, the location of the cuttable portion of the tab may be clearer, so the surgeon can make sure both strands of the suture thread have been cut before beginning to remove the tab. The different designs (i.e., cutting window and ridges and valleys) for indications of the cuttable portion of the tabs enable the tabs 110, 900 and 1100 to be utilized with different sized cuffs. For example, the tab 110 may work well with larger cuffs that may not require as much flexibility and the tabs 900 and 1100 may work well with smaller cuffs because the ridges and valleys make the tabs more longitudinally flexibly while maintain lateral stiffness. Although, as further explained below, either design may be used with different sized neural devices.

In other embodiments, the tab 110, 900 or 1100 may only include a single passage (such as 116, 124, 908 or 910, for example), where the suture thread 112 or 1101 movably passes through a passage means, out of the tab and through an eyelet of a neural cuff (which may only have a single arm) and passes back into the tab to be anchored or adhered to the tab. Once the tab is cut around the central portion where the cutting window may be provided or simply far enough from the distal end along one of the valleys, the suture thread can be released and pulled out of the eyelet of the cuff, so that both the suture thread and the tab may be cleanly and safely removed. The single passage may be centrally located within the tab 110, 900 or 1100 or located away from the center of the tab.

Figure 12A:
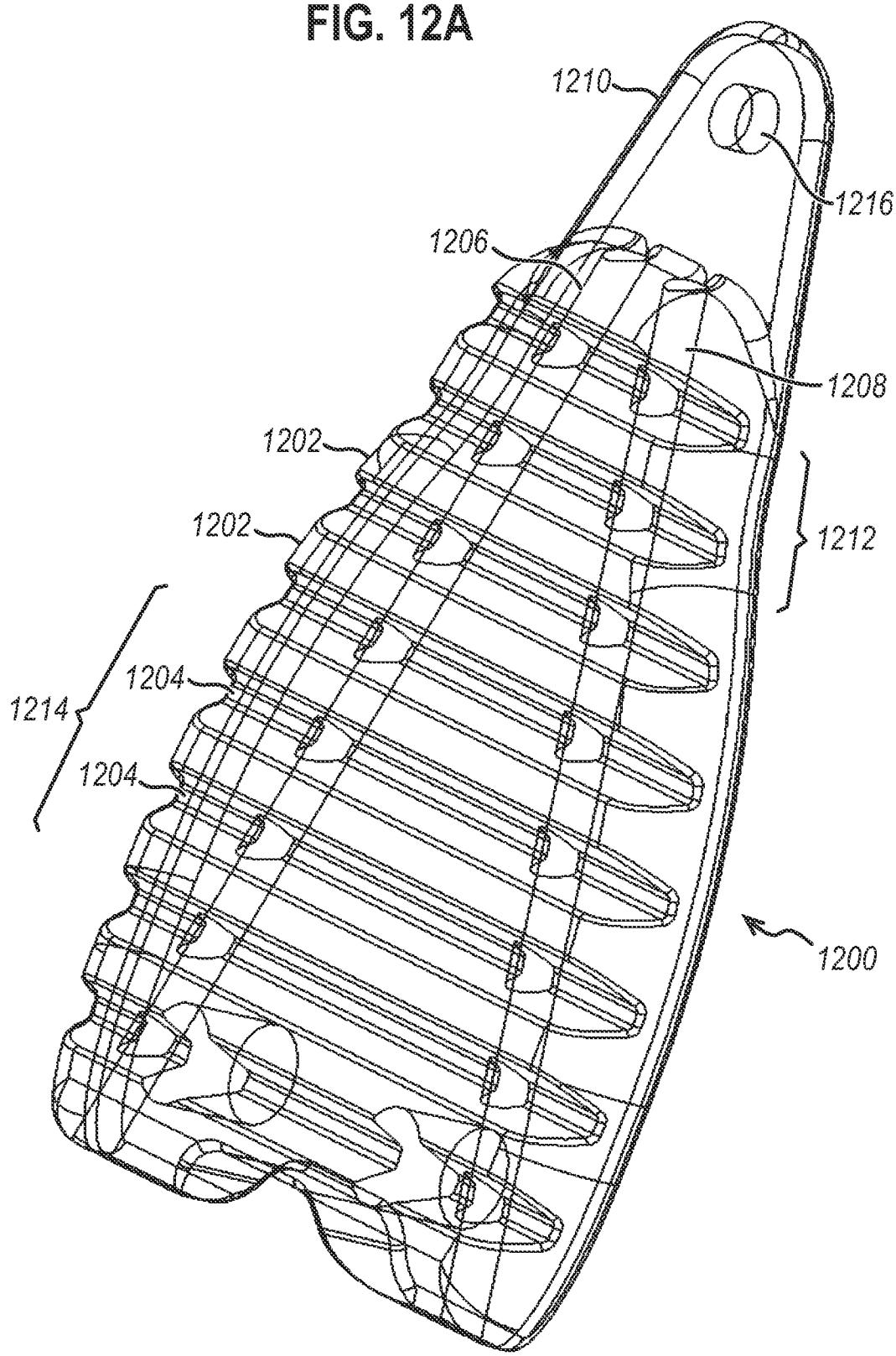
FIG. 12A is a perspective, see-through view of the ridges and valleys of a deployment tab illustrating the suture passages beneath and a more tapered proximal end.
Figure 12B:
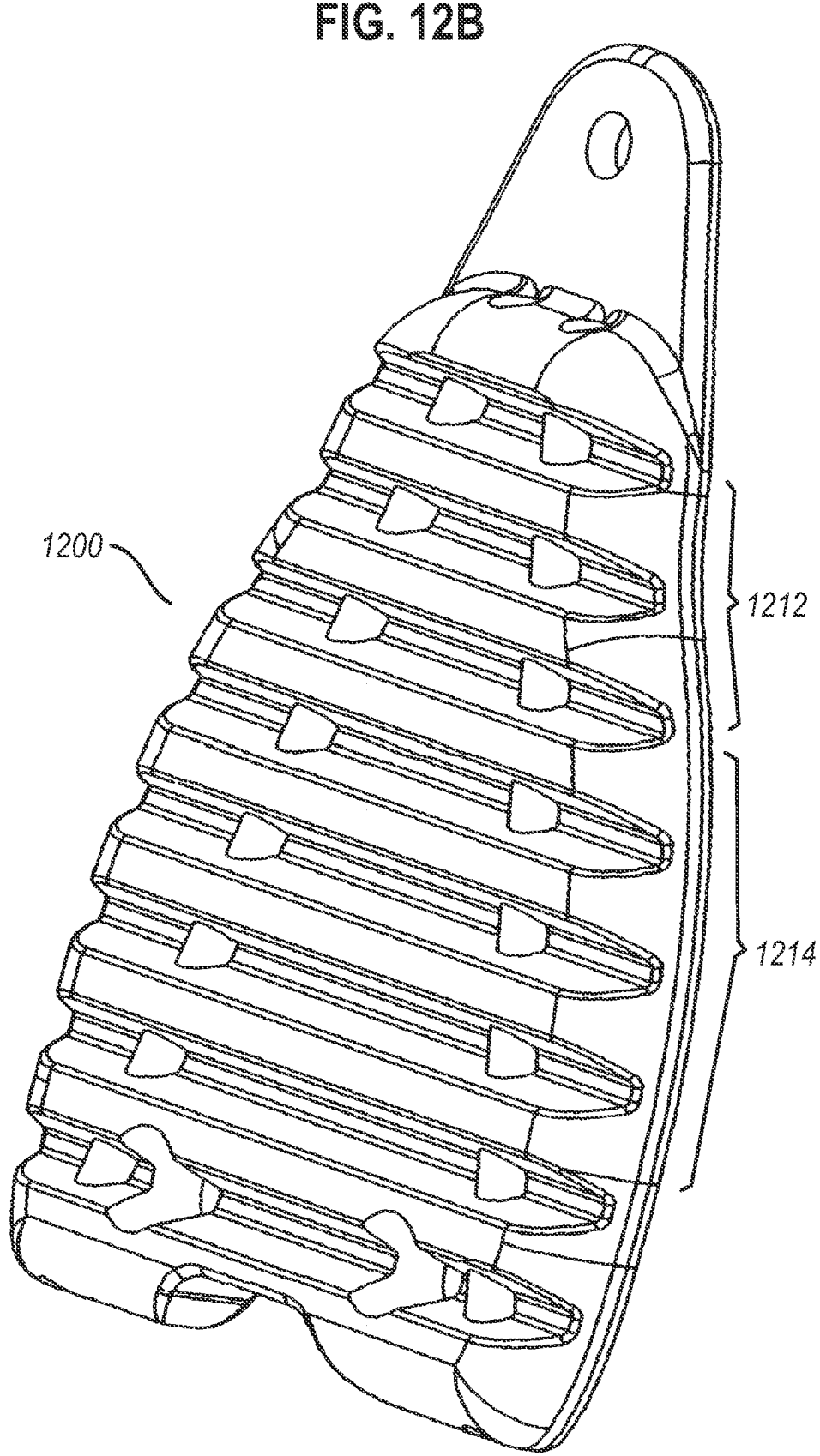
FIG. 12B is a perspective, solid view of the deployment tab of FIG. 12A.

An embodiment of a tab 1200 similar to that of tab 1100 is illustrated in FIG. 12A and FIG. 12B. FIG. 12A provides a perspective, see-through view of the ridges 1202 and valleys 1204 so that the suture thread passages 1206, 1208 are visible beneath. FIG. 12B shows the same perspective view of tab 1200, but in solid view instead of see-through. In the embodiment, the proximal end 1210 may have a more tapered contour and softer transition 1212 from the proximal end 1210 to the central area 1214 where the tab 1200 is more likely to be cut during surgery. As noted above with respect to FIG. 3, a surgical tool may be used to dissect an area of tissue under target tissue, grasp the suture knot or proximal end of the tab and fully pull the tab under the target tissue so the neural device may be deployed. The tapered proximal end 1210 of the tab 1200 may also serve as a gripping point for a surgical tool that may be used to pull on the tab 1200. A grip opening 1216 at the proximal end 1210 of the tab 1200 may give the surgical tool a better grip on the tab 1200 near the gripping point. The more tapered contour of the proximal end 1210 may make it easier to dissect tissue under the target and begin to pull the tab 1200 through the dissection, which reducing irritation of the tissue. Likewise, the softer transition 1212 between the proximal end 1210 and the central area 1214 may make it easier to pull the tab 1200 through the dissected tissue and reduce tissue irritation.

Figure 12C:
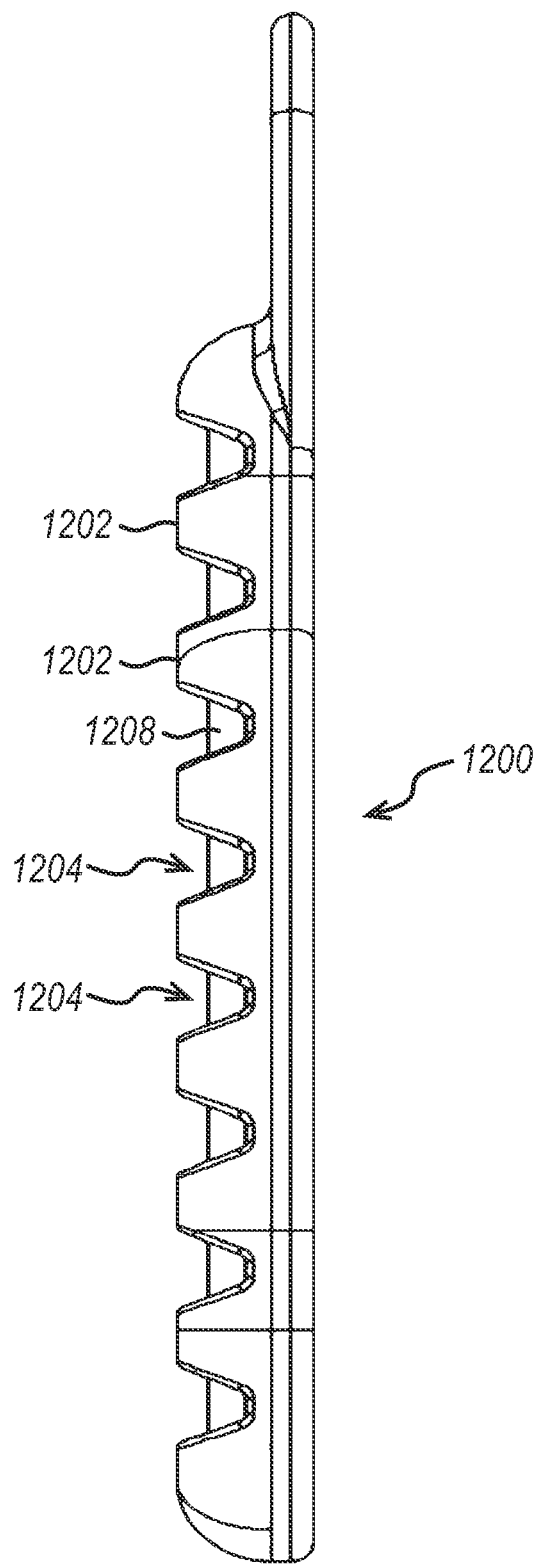
FIG. 12C is a side, solid view of the deployment tab of FIG. 12A.

FIG. 12B more fully illustrates the transition 1212 and the central area 1214 of tab 1200. FIG. 12C is a right side, solid view of the deployment tab of FIG. 12A and FIG. 12B more fully illustrating the ridges 1202, valleys 1204 and suture thread passage 1208.

Whilst the above deployment tabs, 110, 900, 1100, 1200 have been described as comprising two passages or tunnels, the deployment tab, 110, 900, 1100, 1200 may comprise just one passage, or more than 2 passages.

Figure 13A:
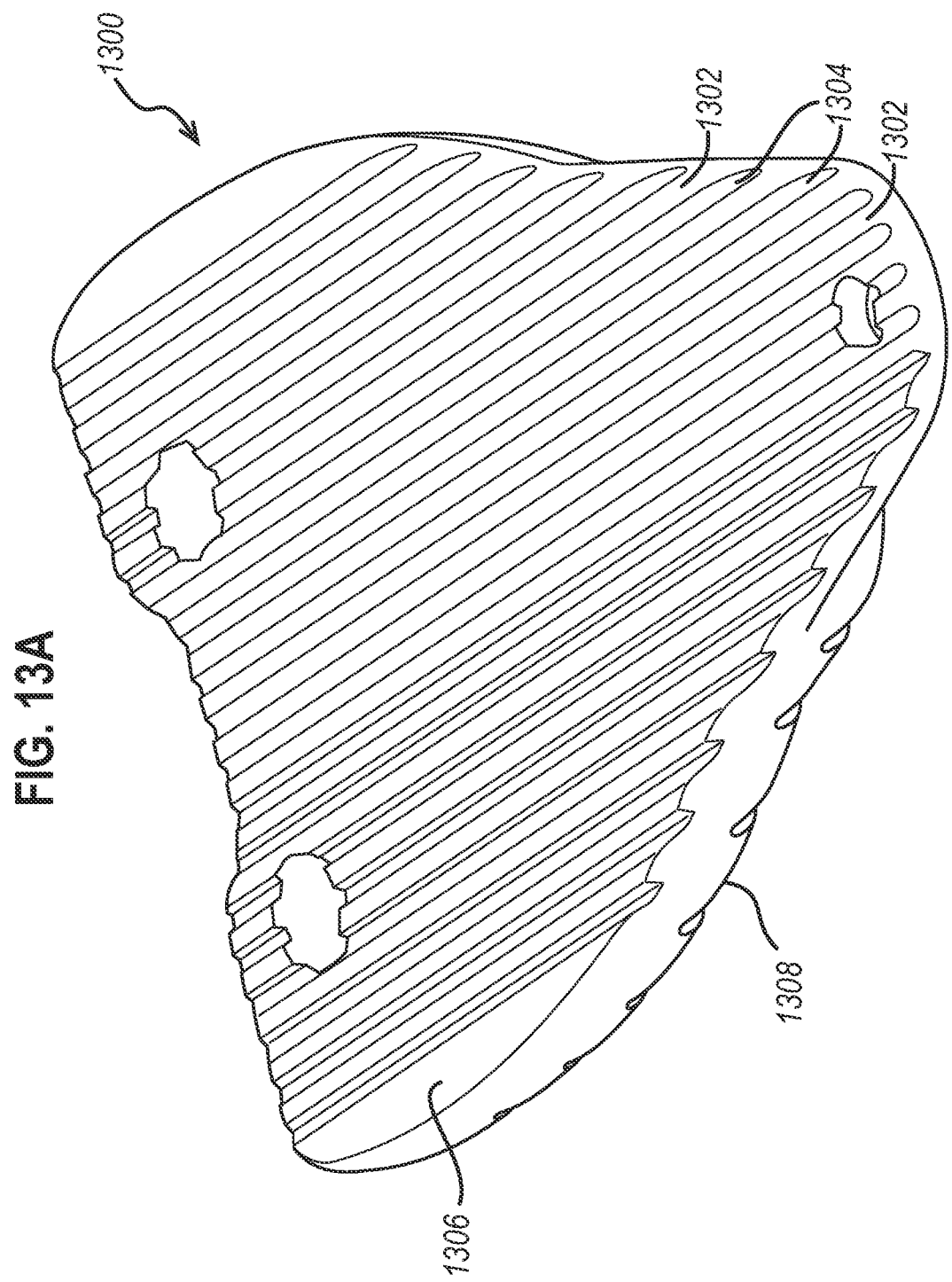
FIG. 13A is a perspective view a deployment tab having longitudinal ridges and valleys on one side.
Figures 1, 13B:
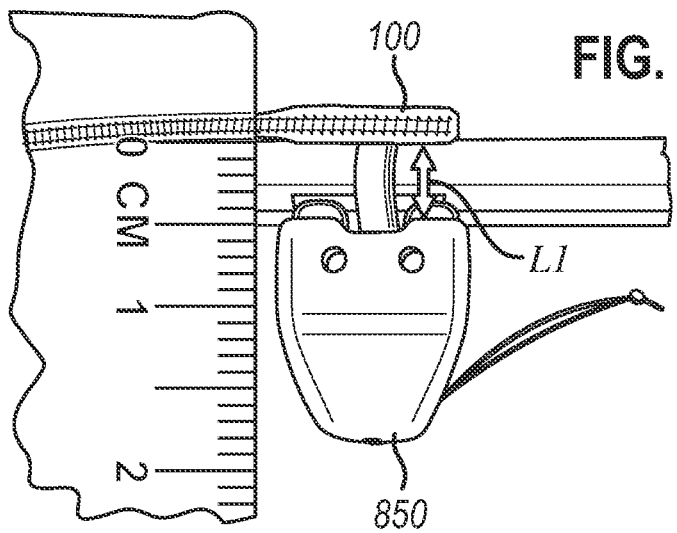
Figures 2, 13B:
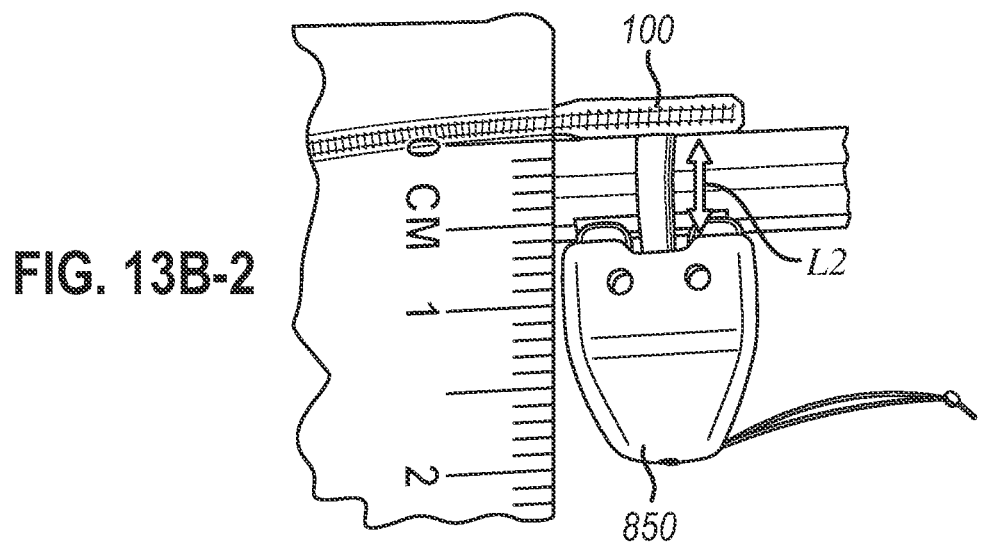
Figures 3, 13B:
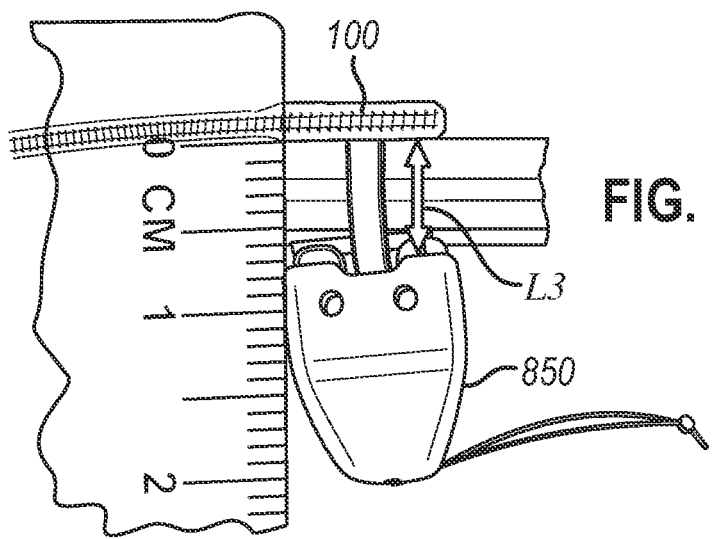

FIG. 13A is a perspective view of an embodiment of a deployment tab 1300 having a plurality of longitudinal ridges 1302 and valleys 1304 on a side 1306, such as a bottom side (or vice versa), opposite the side 1308, such as a top side (or vice versa), of the tab 1300 including the suture thread passages and an indication of the cuttable portion. The plurality of longitudinal ridges 1302 and valleys 1304 may be formed by longitudinal grooves formed in the side 1306. The tab 1300 may also be more tapered than previously discussed embodiments, such that some of the longitudinal grooves run from a first area near where the tab is held close to the implantable device to a second area at the tapered end of the tab through a central area between the first area and second area, while other longitudinal grooves start at the first area and terminate in the central area because of the tapering.

The tabs disclosed herein may be manufactured of silicone, which may, in certain instances, become sticky due to cleaning and sterilization, which may be exacerbated during long term storage. The stickiness of the silicone may be partly mitigated by the addition of barium sulfate to the silicone, which may also make the tab radio opaque, which may have other benefits. The stickiness may be further mitigated through the addition of the ridges 1302 and valleys 1304 of the bottom side 1306 of tab 1300. As the bottom side 1306 of the tab 1300 faces the silicone covered neural cuff when the cuff is rolled up inside the tab 1300, the longitudinal ridges 1302 and valleys 1304 of the bottom side 1306 may help to minimize areas of contact between the silicon of the tab 1300 and the neural cuff. In addition, the longitudinal ridges 1302 and valleys 1304 may have the added benefit of reducing surface contact with dissected tissue, thereby making it easier for the tab to be pulled under target tissue/bundle than would a flat (ungrooved) surface.

In some embodiments, the tab may be formed of other biocompatible substance similar to silicone, such as styrene isoprene butadiene (SIBS), polyamide, parylene, liquid-elystal polymer (LCP), polytetrailuoroethylene (PTFE), polyethylene (PE), polypropylene (PP), fluorinated ethylene propylene (FEP), ethylene-tetrafluoroethylene (ETFE), polyurethane, or another biocompatible polymer. The choice of the material may depend on the desired flexibility or stiffness.

Figures 1, 13C:
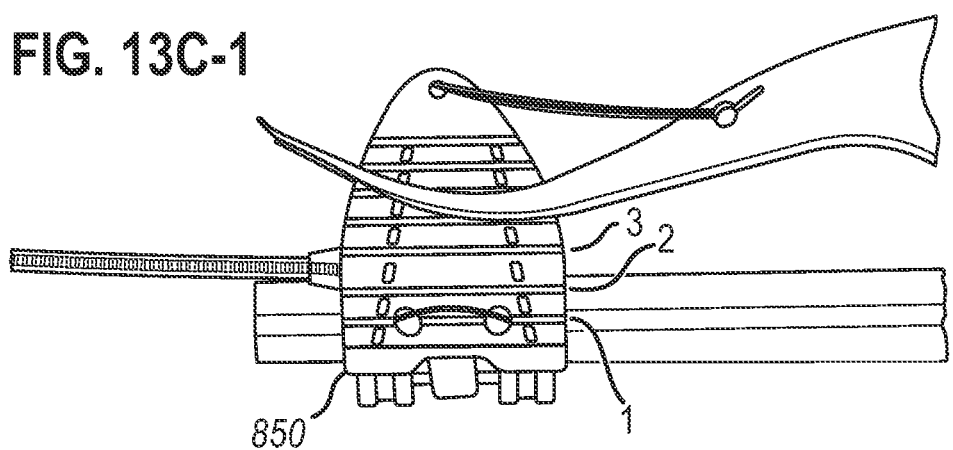
Figures 2, 13C:
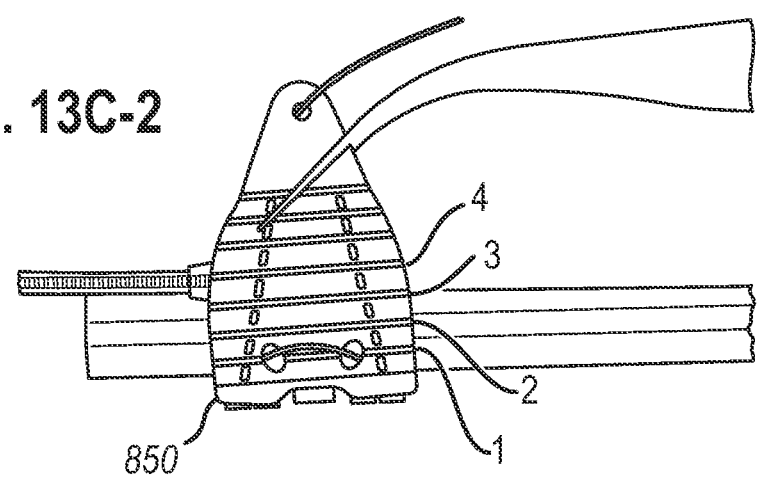
Figures 3, 13C:
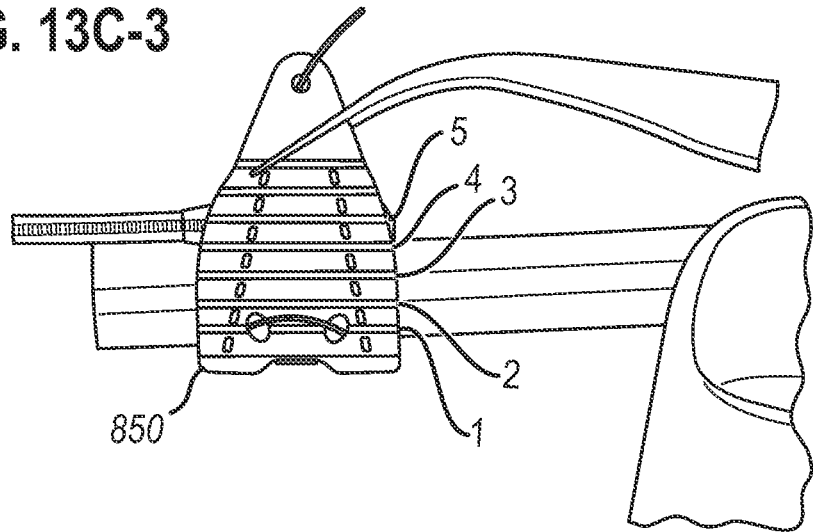
Figures 4, 13C:
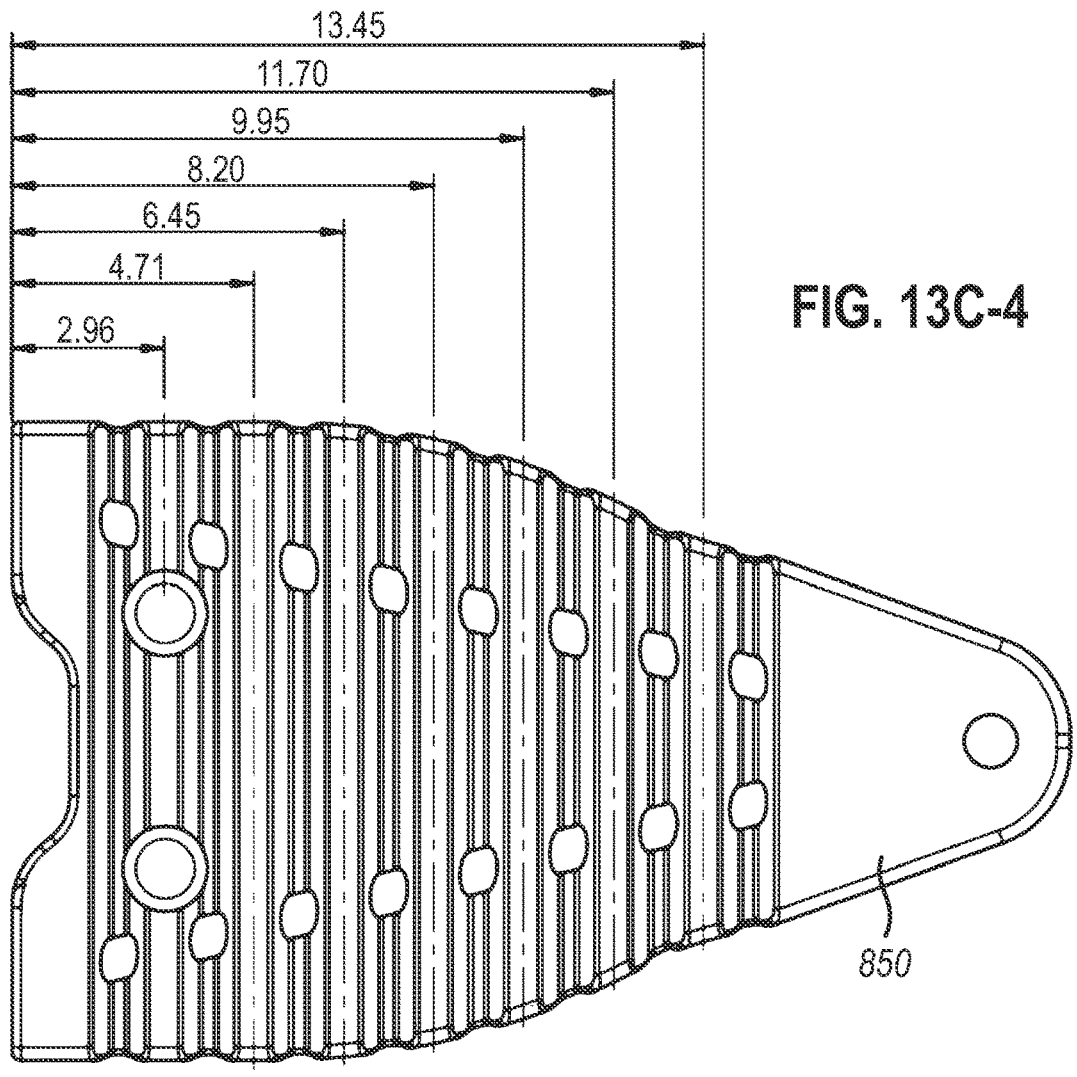
Figure 13D:
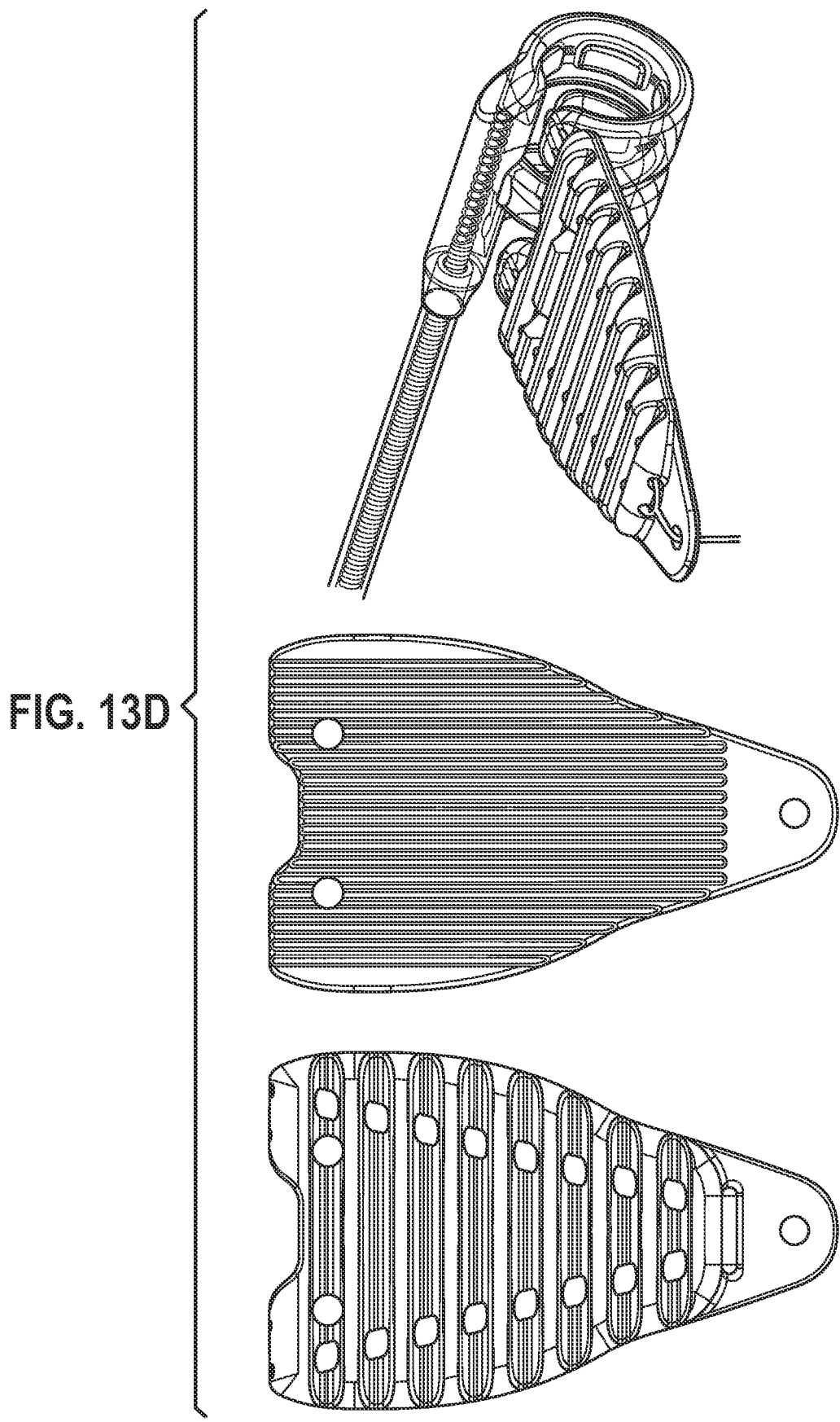
FIG. 13D is a top view and a bottom view of a deployment and a perspective view of the same deployment tab sutured to neural cuff in accordance with an embodiment.

In some embodiments, as further illustrated in FIG. 13D, the deployment tabs disclosed herein include rounded edges to reduce damage to tissue of a patient when the implantable device is being positioned around a target within the patient. FIG. 13D also provides additional illustrations of a deployment tab having ridges and valleys on both sides.

The tabs disclosed herein provide advantages in addition to the delivery, positioning and deployment of neural interface 100. For example, in some embodiments the tab can be used as a measuring tool. In one embodiment, referring to FIGS. 13B-1, 13B-2 and 13B-3, a gap between an end of tab body 850 and spinal portion of the neural interface 100 having a length L (which may also be referred to as a diameter or radial gap of the neural interface when deployed onto the target tissue) can be measured to determine a degree or amount of stretching of the neural interface 100 around the target tissue. This also characterizes a radial length of an electrode arm opening. Understanding these characteristics can be useful to a medical professional user when determining whether an appropriate size of neural interface 100 has been selected for the target tissue. In FIGS. 13B-1, 13B-2 and 13B-3, radial gaps of L1, L2 and L3, respectively, are shown and can be assessed by a medical professional user during delivery and deployment of neural interface 800.

In another use of the tab, and referring to FIGS. 13C-1, 13C-2 and 13C-3 and 13C-4, the rib-and-groove structure of the tab body 850 can be used as a "measuring tape"-style measurement tool in some embodiments. The rib-and-groove structure of body 850 can be flexible such that it at least partially conforms around the target tissue, and in doing so it provides another way in which a medical professional user can use body 850 to assess size and fit of neural interface 100 relative to target tissue. This can be accomplished in several ways. In one embodiment, information can be provided to a medical professional user that translates a number of ribs (or grooves) into usable information. For example, if 3-5 ribs span the target tissue the size of the cuff may be acceptable, while if 2 or fewer span the target tissue it may mean the cuff is too large and if 6 or more ribs span the target tissue it may mean the cuff is too small. Thus, simply counting the ribs (or grooves) spanning the target tissue can directly provide fit information, as illustrated in FIGS. 13C-1 (showing labeled ribs 1, 2 and 3), 13C-2 (showing labeled ribs 1, 2, 3 and 4) and 13C-3 (showing labeled ribs 1, 2, 3, 4 and 5). In another embodiment, a medical professional user can first count ribs (or grooves) as shown in FIGS. 13C-1, 13C-2 and 13C-3 and use known measurements between adjacent ribs (or grooves) to assess size and fit, as shown in FIG. 13C-4. Similarly, the known measurements can be translated into a table showing cuff opening as a fraction of circumference and advising medical professional users as to which are suitable or not. In the table of FIG. 13C-4, the third through seventh values are optimal, the first two indicate the cuff is too large, and the last two that the cuff is too small for the target tissue.

Figure 20:
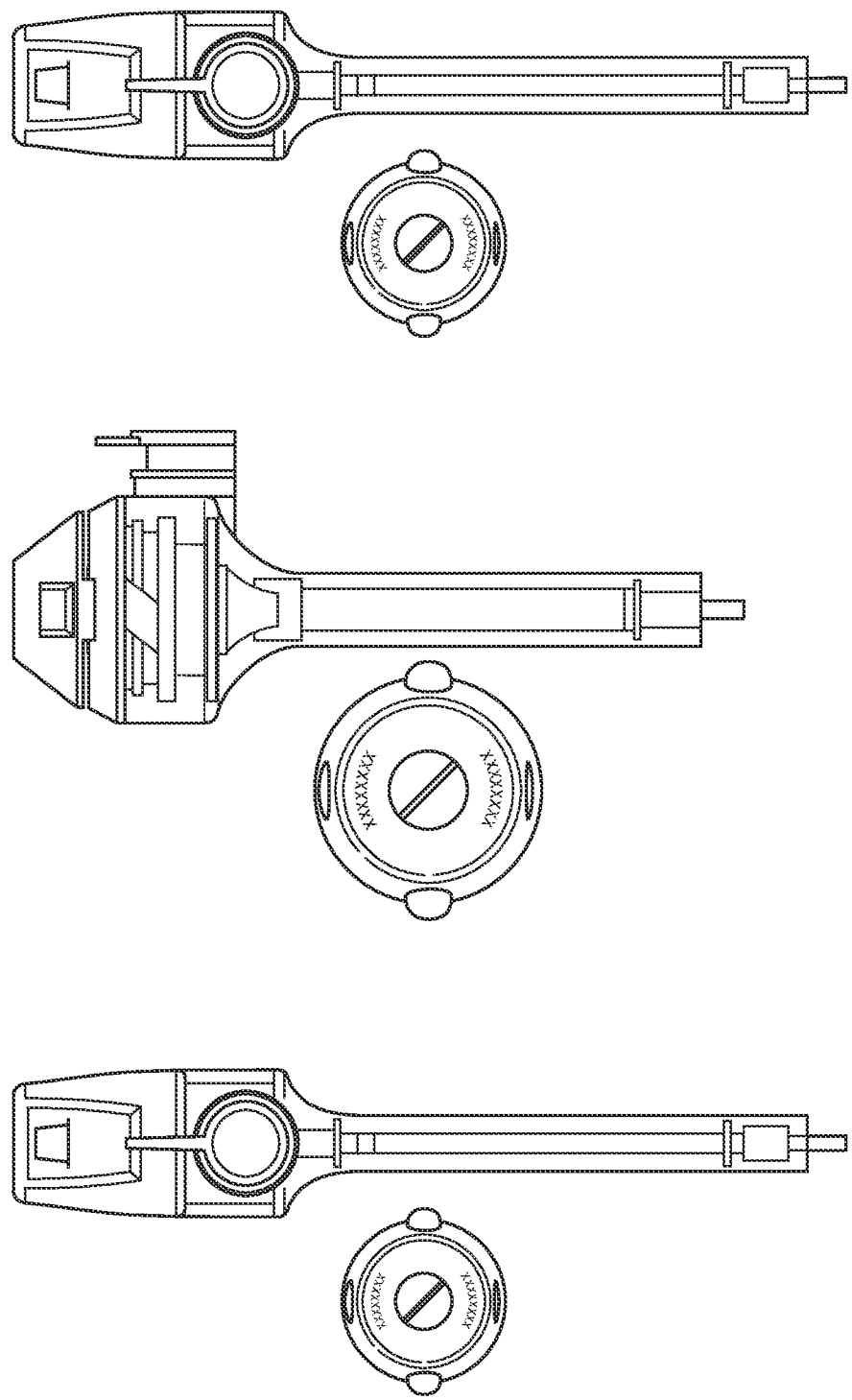
FIG. 20 is a series of proximal end and side views of three different trocar ports.

In addition to improving deployment of cuffs for deployment and implantation, the various tabs disclosed herein may also improve delivery, which is the act of getting the cuff into a patient, typically through their abdominal cavity. Laparoscopic surgery may be a preferred surgical method for introducing neuromodulation or neurostimulation systems into a patient's body in some cases as this method can minimize the risk of infection, reduce post-operative pain, and offer fewer complications. Laparoscopic surgery may be particularly applicable to those neuromodulation applications where the target nerve or neurovascular bundle is in the abdominal cavity. The introduction of tools and devices into the body cavity during laparoscopic surgeries may be accomplished via laparoscopic ports, called "trocar ports" or "trocars," which often contain more than one flexible valve to prevent the escape of insufflation gas, i.e., inert gas pumped into the body to create additional working and visual space during surgery. Side views and corresponding proximal (i.e., closest to operator/surgeon or outside of body of patient) end views of three different trocar ports are shown in FIG. 20. A trocar can also be referred to as an insertion tube.

Neural interfaces, particularly neural cuffs, and their leads can contain many fragile electrical connections. Passing a neural cuff, for example, through the valves of a trocar port without a protection mechanism poses high risk of damaging the electrodes. Since the integrity of the electrodes is important to the cuff's stimulation effectiveness and safety, the risk of electrode damage via laparoscopic introduction needs to be mitigated. Embodiments described herein enable the insertion device to interact with trocar seals and provide careful guidance for the delicate neural cuff as it is delivered into abdominal cavity, including maintaining the cuff's orientation and position. Embodiments also allow for release of the cuff into the abdominal cavity and serve to protect the electrode surface on the inside of the cuff until the "unrolling step. All embodiments provide a method for deployment of laparoscopic neuromodulation cuffs in the lowest risk, most expedient manner, thereby minimizing damage to the cuff during delivery, which is useful as small tears in the molding or the necking of wires or electrodes can be difficult to detect and because such damage can propagate over time.

Figure 14A:
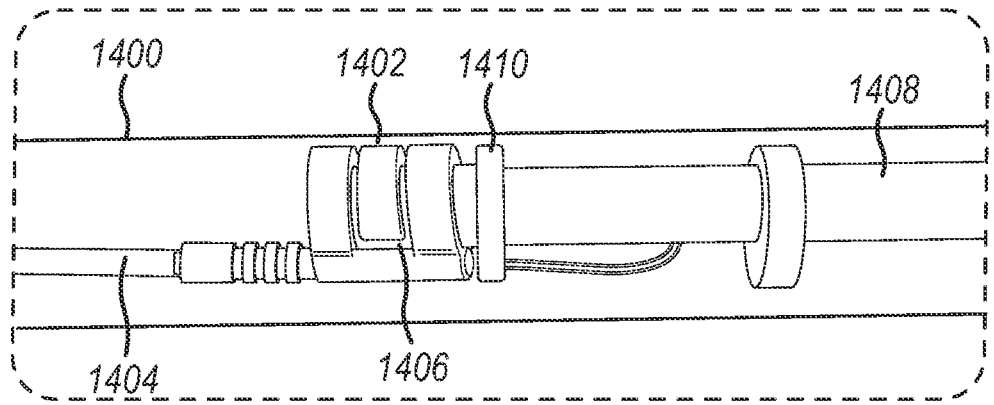
FIG. 14A is a perspective view of a delivery tool for a neural interface in accordance with an embodiment.
Figure 14B:
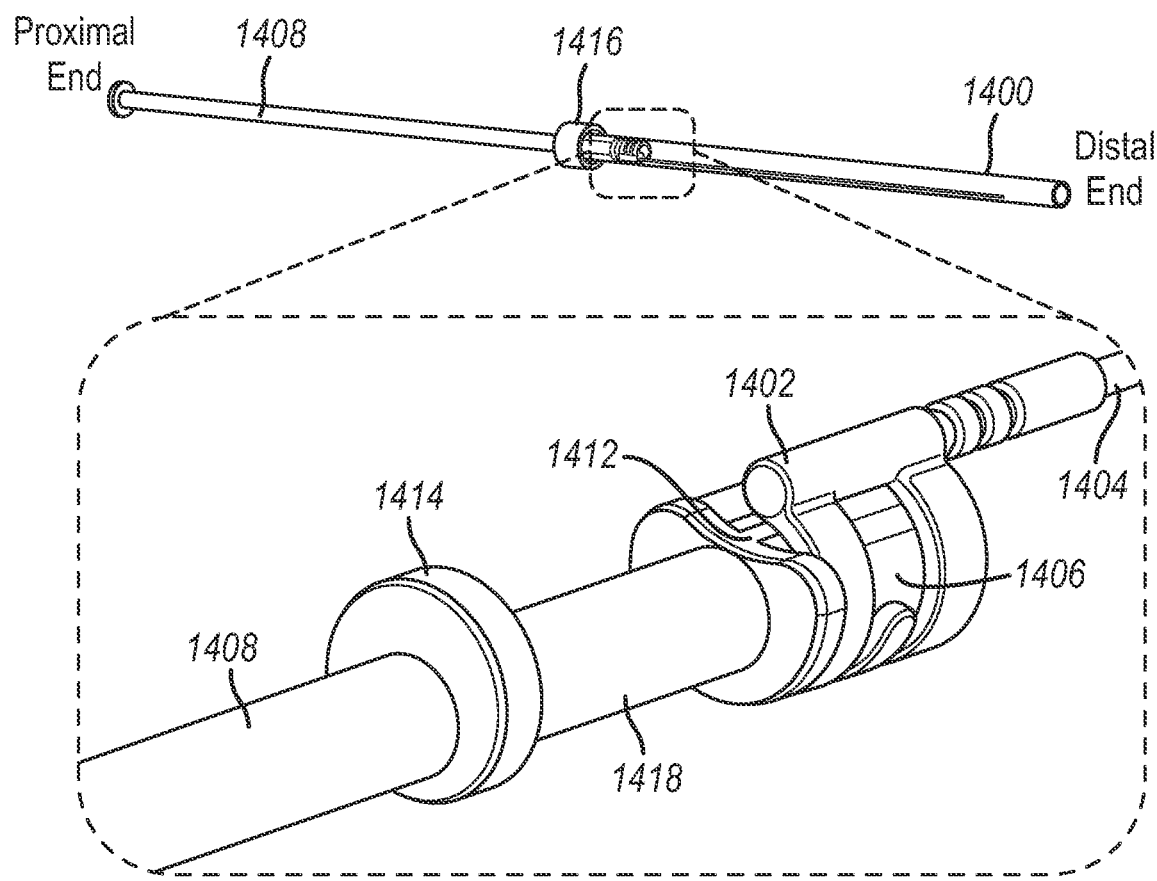
FIG. 14B is a perspective view with a blown-up section of the delivery tool of FIG. 14A in accordance with an embodiment.

An embodiment of a delivery tube or neural delivery device (also referred to as a cannula) including a pusher rod is illustrated in FIGS. 14A and 14B. The overall device including the deliver tube 1400, pusher rod 1408, and proximal end seal is illustrated in FIG. 14B. FIG. 14A and a breakout blown up section of FIG. 14B further illustrate details of the pusher rod 1408 and neural cuff 1402. The delivery tube of this design may be suitable for a range of trocar port sizes, such as 12 mm and 15 mm, and therefore different neural interface sizes, and may be compatible, depending on the size of the mounting post, with a neural cuff that includes or does not include a deployment tab. For example, a larger mounting post may be suitable for a larger cuff design or a smaller cuff design that does not include a tab rolled up inside the cuff during delivery, while a smaller mounting post may be suitable for smaller cuffs or cuffs that include a rolled up tab. As will be understood by the skilled person, when the application refers to a delivery tube, this tube can be a hollow tubular structure, or it can alternatively be provided by a solid-cylinder with a hollow end or blind bore (i.e. such that there is a tube structure around at least the neural interface device). It may be understood that "solid" refers to a structure where the interior is completely filled up or free from cavities. For example, a unitary steel or polymer cylinder would be a solid cylinder. It is to be understood that where "delivery tube" is used in the specification, this is intended to cover both of these embodiments. Moreover, it is to be understood that a "delivery tube" refers to a neural delivery device.

The embodiment may further include a flanged pusher rod 1408 with a mounting post 1406, a suture loop management cut out 1412 and a secondary flange 1414. FIG. 12A illustrates a portion of delivery tube 1400 for insertion into a trocar port (shown in FIG. 20) with a neural cuff 1402 positioned inside with the lead 1404 extending toward the distal end of the delivery tube 1400. A neural cuff 1402 may be mounted on a mounting post 1406 of a pusher rod 1408. The mounting post 1406 may be a cylindrical portion of the distal end of the pusher rod 1408. The diameter of the mounting post 1406 may be sized to match the internal diameter of the neural cuff 1402 with or without a deployment tab (not shown in FIG. 12A or FIG. 12B) rolled up within the neural cuff 1402.

The delivery tube 1400 may have an internal diameter that is larger than the outer diameter of the neural cuff 1402 when mounted on the mounting post 1406, but smaller than the outer diameter of a flange 1410. The flange 1410 may contact and slide against an inner wall of the delivery tube 1400, which together with the sizing of the components may prevent the silicone of the neural cuff and its lead 1404 from contacting the inner wall of the delivery tube 1400. This may enable the cuff 1402 to advance smoothly through the inside of the delivery tube 1400 without the arms or other parts of the neural cuff 1402 getting entangled and damaged. The flange 1410 may work with the mounting post to control the orientation of the cuff 1402 as it is pushed through the delivery tube 1400. It should be noted that the cuff is mounted at the end of the pusher rod with the lead extending toward the distal end of the delivery tube, i.e., the lead body leads the bulk of the cuff. The lead body of the cuff is inserted through the trocar port prior to the introduction of the delivery tube with the cuff as shown in some of the figures.

A cut out 1412 further illustrated in FIG. 14B may allow a surgical tool to tug away a suture loop (not shown) that may have been used to maintain the cuff on the mounting post 1406 and maintain the cuff's orientation. For example, a suture thread may be wound around a portion of the cuff 1402, pass over the area of the cut out 1412, and be wound around a portion 1418 of the pusher rod 1408 between the cut out 1412 and the flange 1414 so as to hold the cuff in a relatively fixed position until the suture thread is removed. The mounting post 1406 may protect the electrodes of the cuff 1402 while the flange 1410 and cut out 1412 may minimize the cuff 1402 rubbing against the delivery tube.

As further illustrated in FIG. 14B, a secondary flange 1414 may enable the pusher rod 1408 to slide against the inner walls of the delivery tube 1400 in a stable, low friction manner and may prevent the pusher rod 1408 from tilting in a way that would allow the cuff to contact the inner walls of the tube 1400. A proximal seal 1416 may close the proximal end of the delivery tube 1400 so that only the distal end is open and enable the delivery tube to cooperate with the trocar port to keep the abdominal opening tightly sealed. The seal 1416 is mounted around the pusher rod 1408 so the pusher rod 1408 can move in and out of the delivery tube 1400 without allowing insufflation gas to escape.

An embodiment of a different delivery mechanism is illustrated in FIGS. 15A, 15B, 15C and 15D, which may also be suitable for a range of trocar port sizes and may be compatible with a neural cuff that does or does not include a deployment tab. The embodiment may include a delivery tube (or pusher tube) 1500 instead of a delivery tube and pusher rod as described in the embodiment of FIGS. 14A and 14B. As noted above, this delivery tube/pusher tube refers to a neural delivery device. The delivery tube 1500, shown in perspective as the delivery tube 1500 and in cross section in FIG. 15A, includes a wall 1502 inside the delivery tube 1500 that may prevent insufflation gas leaking and may keep the cuff 1504 or other neural interface device at a distal (furthest from the trocar port once inserted) end of the delivery tube. In some embodiments, the proximal cavity behind wall 1502 may be solid. The cuff 1504, without or with a deployment tab, may be positioned in delivery tube 1500 with lead 1506 extending toward the distal end. A deployment tab, such as deployment tab 110, 900, 1100 or 1200 may also be attached to the cuff and rolled up inside the cuff as further described below and as shown in FIG. 16B. The inside diameter of the delivery tube 1502 may be tailored based on the size of a required neural interface device to be delivered. The inside diameter of the delivery tube 1502 may be determined based on the neural interface device to be delivered, or more specifically on an external diameter (or an external width) of the neural interface device to be delivered. The inside diameter of the delivery tube 1502 may almost be equal to the external diameter of the neural interface device to provide and maintain some level of friction with the cuff 1504 so as to provide a level of retention. In other words, the inside diameter of the opening of the delivery tube provides an interference fit with the neural interface device.

The delivery tube 1502 comprises a delivery tube retention feature in a form of a flange provided at a proximal end for configured to prevent the delivery tube from passing through the trocar (insertion tube) by more than a predetermined amount, or fully through the trocar. The presence of the flange prevents the delivery tube 1502 from passing through the trocar beyond the flange.

Figure 15A:
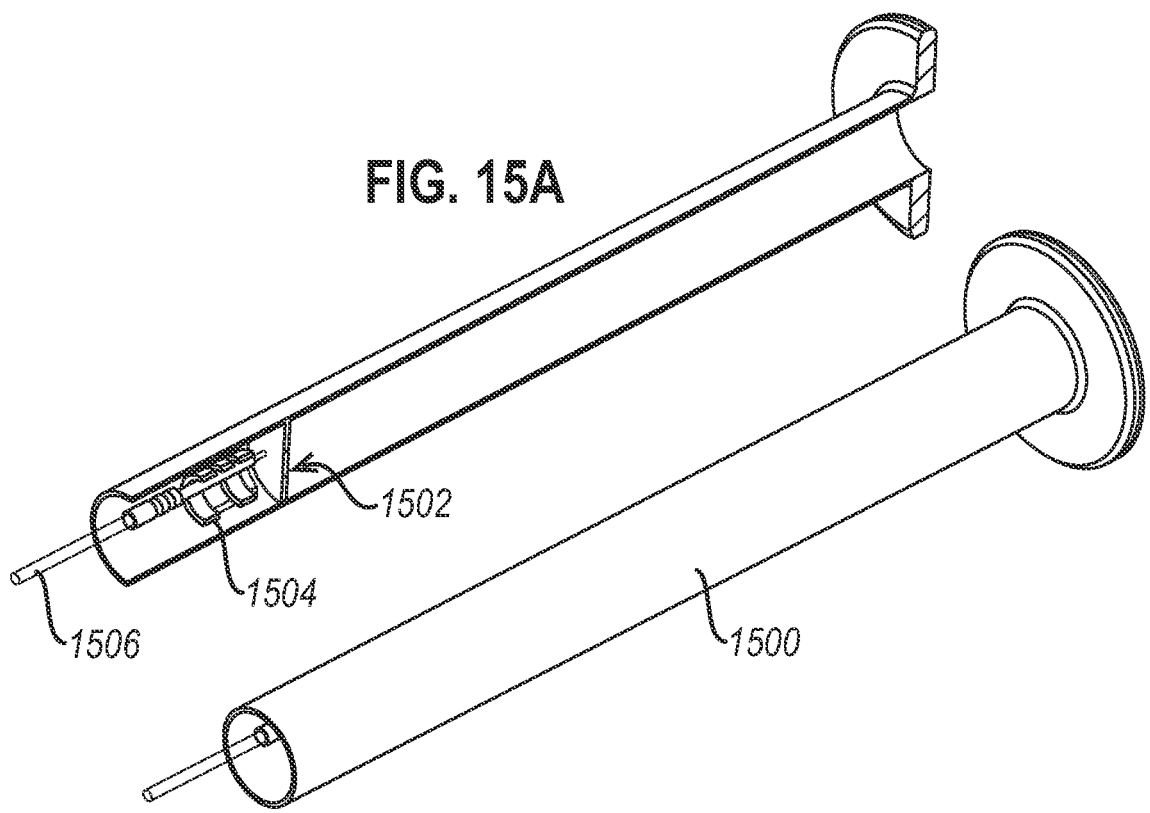
FIG. 15A is a perspective and cross-section view of a delivery tool in accordance with an embodiment.
Figure 15B:
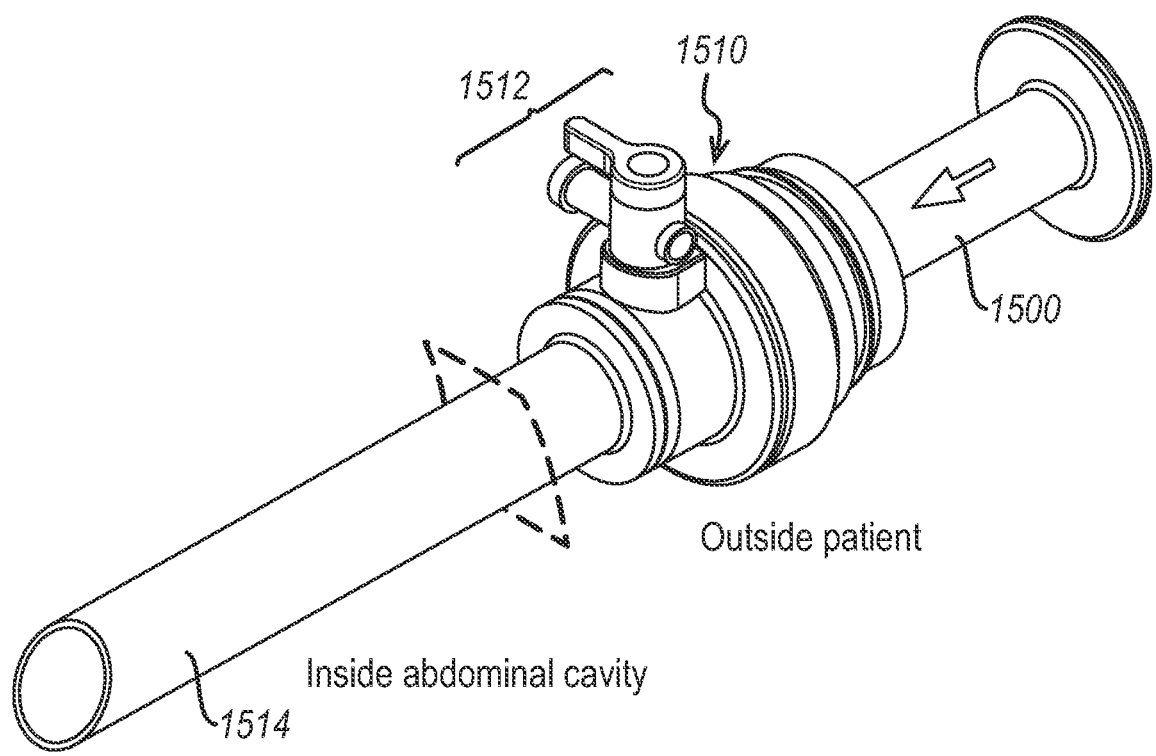
FIG. 15B is a perspective view of the delivery tool of FIG. 15A partly inserted in a trocar port in accordance with an embodiment.
Figure 15E:
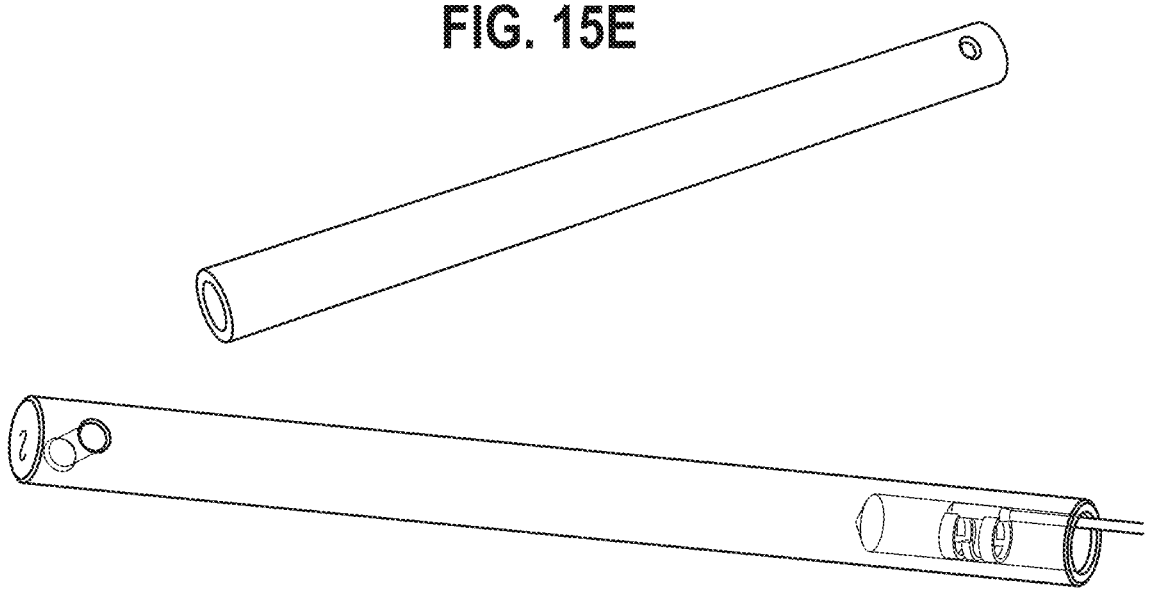
FIG. 15E is two perspective views of a delivery tool in accordance with an embodiment.
Figure 15F:
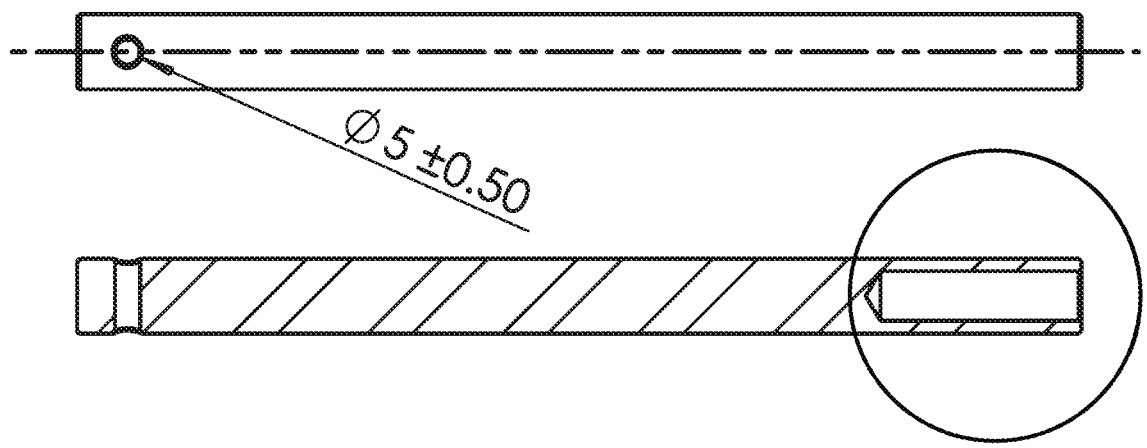
FIG. 15F is a side view and a cross-sectional view of the delivery tool of FIG. 15E.

Another embodiment similar to those shown in FIGS. 15A, 15B, 15C and 15D is illustrated in FIGS. 15E and 15F, which may also be suitable for a range of trocar port sizes and may be compatible with a neural interface that does or does not include a deployment tab. Whilst this is referred to below as a neural delivery device, it is noted that such a device can also be referred to as a delivery tube, as the neural delivery device is formed with a tubular structure at the distal end (in order to retain the neural interface device). A side cross-section view of this embodiment is shown in FIG. 26.

As shown in FIG. 26, the neural delivery device 3000 may include an opening 3001 (otherwise referred to as an open end, or a hole) at the distal end of the neural delivery device for holding a neural interface device.

The embodiment of FIGS. 15E and 15F may include a neural delivery device formed as a solid-cylinder (in contrast to the hollow cylinder depicted in FIGS. 14A and 14B). It may also be said that the neural delivery device of FIGS. 15E and 15F has a tubular structure around the neural interface device, whilst the remainder of the shaft of the neural delivery device is substantially solid.

This neural delivery device may be long enough so as to protrude out the end of the insertion tube. This allows the neural delivery device to be manually maneuvered/held by a surgeon at the proximal end. Additionally or alternatively, the neural delivery device can connect to a separate mechanical structure/plunger arrangement for controlling the movement of the neural delivery device.

FIG. 15E shows a neural delivery device formed of stainless steel. The open end may be formed by drilling a hole into a solid steel cylinder to fit the size of the neural interface device to be delivered. An inside wall of the open end of the neural delivery device may provide friction by using interference fit as discussed above to hold the neural interface device in place, near the opening, until it is pulled out of the opening for deployment. The neural interface may be pulled via its lead body. As the neural interface device to be delivered is provided around an opening of the open end, the neural interface device is only required to travel (when pulled) a short distance until it is released. Therefore, tangling of the neural interface can be avoided, while taking advantage of the friction between the neural interface device (such as a nerve cuff) and the deployment tube. Through this arrangement, the neural interface device does not make any, or reduced contact with the trocar or the external insertion tube, during the insertion of the neural delivery device into the insertion tube. In other words, the neural interface device is protected from damage, when positioned within the recessed portion of the neural delivery device. This means that any sensitive structure of the neural interface device is shielded from mechanical/electrical damage during the insertion process.

By using a solid cylinder as the base of the neural delivery device, there can be an improvement in the ease of manufacturing. Such a device also obviates the need for any additional mechanical structures for preventing the leakage of insufflation gases which may be required in some other embodiments, as a trocar valve can be used to maintain body pressure and no gases can escape through the solid body of the cannula.

Whilst the embodiment of FIGS. 15E and 15F can be formed of a stainless steel, it can alternatively be formed of a polymer material. In some embodiments, this polymer material can be, e.g., Delrin. In some embodiments, the delivery tube may be formed by injection molding, with any suitable material. It is worth noting that such materials and methods of manufacturing can also be applied to the hollow-tube embodiments (such as the one shown in figures FIGS. 14A and 14B).

The material of the neural delivery device (both in the solid-cylinder and hollow-tube embodiments) should be bio-compatible. Moreover, a polymer material (such as Delrin) is a light-weight materials, which can be beneficial for the reduction of weight in the device. Where further weight reduction is required, the neural delivery device can include further perforations, holes, or the removal of a portion of the neural delivery device, as will be described below.

The neural delivery device can be made by boring a recessed hole of the required size into a solid cylinder of bio-compatible material.

The neural delivery device of FIGS. 15E and 15F also comprises a neural delivery device retention feature. A hole may be formed at a second end of the delivery tube in a direction perpendicular to a length of the delivery tube. A neural delivery device retention feature, such as string or suture thread or any other slim tool, may be provided through the hole to prevent the neural delivery device from passing through the trocar. Moreover, the string or suture thread can be used to retrieve the neural delivery device, and/or provide a pulling force to assist in removing the neural delivery device should this be required.

The neural delivery device retention feature may additionally, or alternatively include a proximal cap (not illustrated) which is configured and positioned to prevent accidental release of the delivery tube. This cap or a handle may be positioned around the proximal end of the neural delivery device and provided to prevent the neural delivery device from passing through the trocar or to assist handling of the neural delivery device. The string/suture and the proximal cap are both able to prevent any accidental release of the delivery tube into the body, particularly in a case where the length of the neural delivery device is shorter than the length of the trocar. It is also noted that the proximal cap can be either a separate feature, or it can be integral with the neural delivery device (e.g. a flaring or increase of the diameter of the neural delivery device at the proximal end such that the external diameter of the neural delivery device at the proximal end is larger than an internal diameter of the insertion tube or the trocar).

In some embodiments, the proximal cap may be formed from a moulded plastics material.

Whilst the neural delivery device retention features above are described in relation to the neural delivery device of FIGS. 15E and 15F, they can also be clearly applied to the hollow-tube embodiments of the neural delivery device (such as the one shown in FIGS. 14A and 14B).

FIG. 15B further illustrates how the pusher tube 1500 operates in conjunction with trocar port 1510, which may include a valve and seal 1512 outside of the patient and an insertion tube 1514 inside the abdominal cavity. The pusher tube 1500 may be inserted through a port opening in the trocar port and into the insertion tube 1514. The outer diameter of the pusher tube 1500 may be smaller than the inner diameter of the port opining of the trocar port 1510 and the inner diameter of the insertion tube 1514. FIG. 15C illustrates the pusher tube 1500 once fully inserted into the trocar port 1510 and FIG. 15D illustrates the neural cuff 1504 once pulled from the open end of the pusher tube 1500. Again, the pusher tube has a sealed proximal end and an open distal end.

Figure 16A:
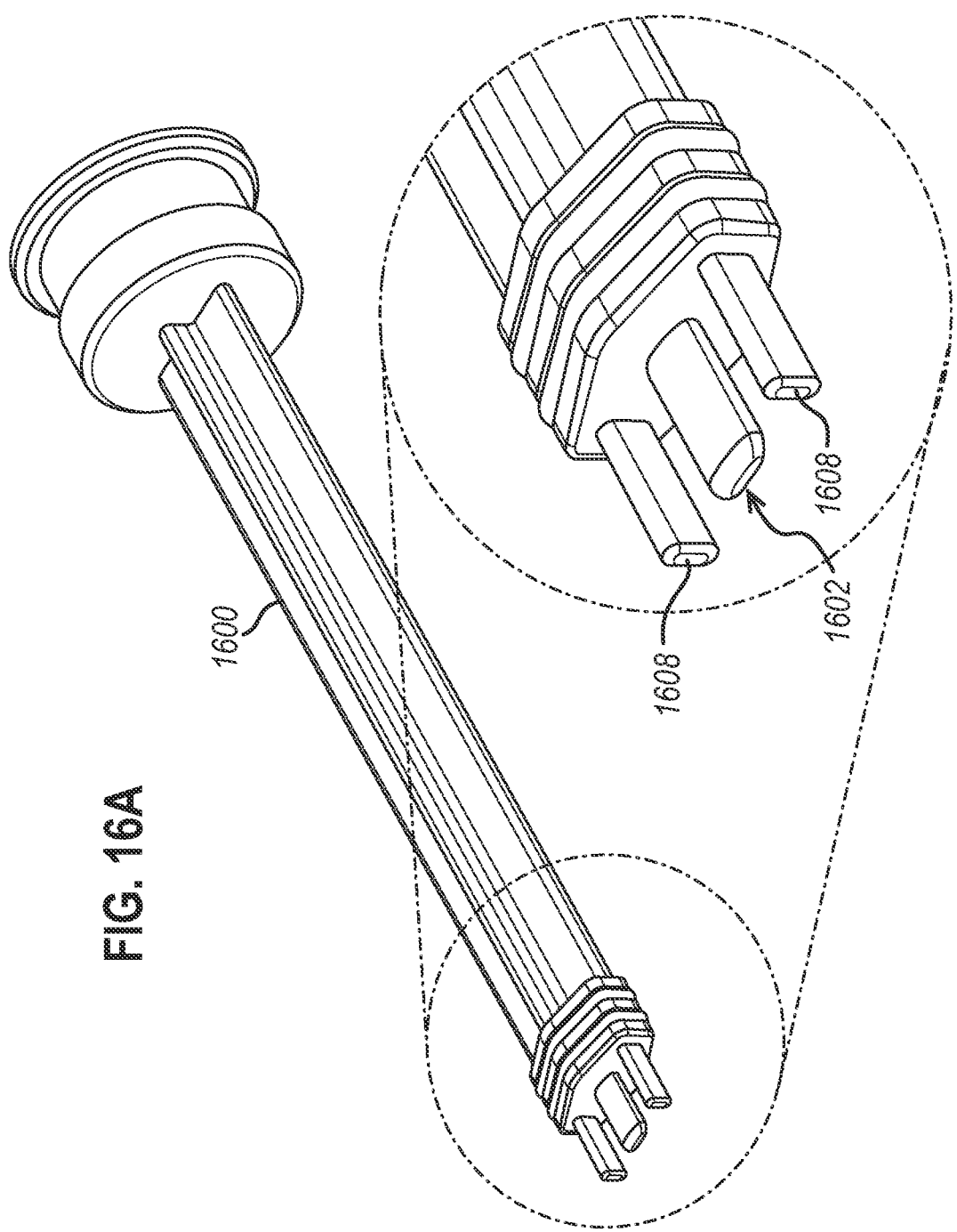
FIG. 16A is a perspective view of a pusher rod with a blown-up view of the distal end in accordance with an embodiment.
Figure 16B:
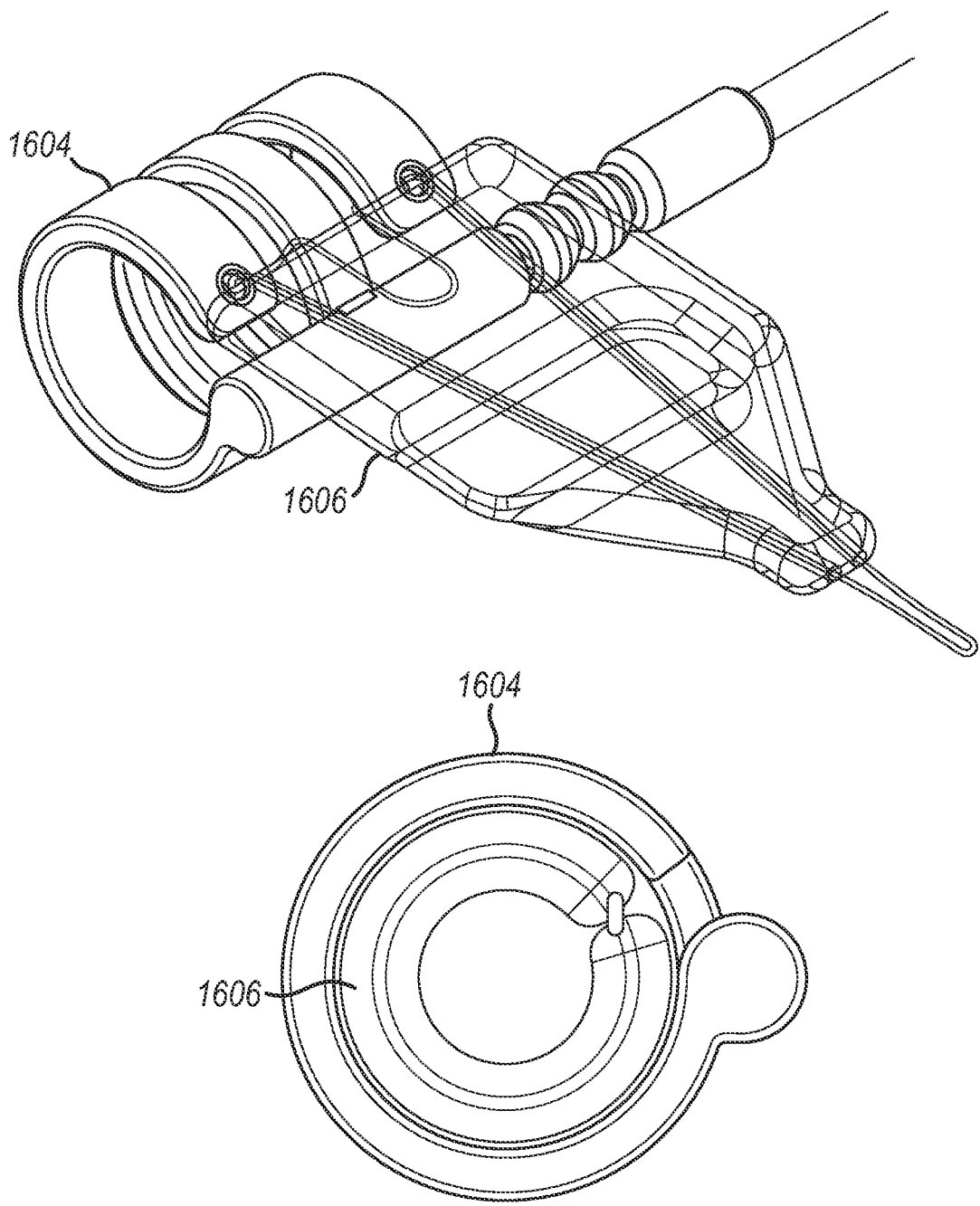
FIG. 16B is a perspective view and a cross-section distal end view of a neural cuff and deployment tab attached to the neural cuff and rolled up inside the cuff in accordance with an embodiment.

An embodiment of a different design for a delivery tube and pusher rod is illustrated in FIGS. 16A, 16B, 16C, 16D, 16E and 16F. The embodiment may be suitable for a custom non-round (or substantially obround) trocar port and may be compatible with a neural cuff that does or does not include a deployment tab. The particular shape, however, of the delivery tube and pusher rod are exemplary and may be shaped in a variety of different ways, such as round, oval, etc. As illustrated in FIGS. 16A and 16B, the embodiment may include a pusher rod 1600 having a central post 1602 at a distal (furthest from the trocar port once inserted) end. The central post 1602 may have a cross-section that matches the shape of a cuff 1604 when a deployment tab 1606 has been rolled up inside the cuff 1604. Although the interior space of the cuff 1604 with the deployment tab 1606 rolled up inside as shown in the end view illustration of FIG. 16B may be substantially circular, the shape of the interior space is more likely oblong like the cross-section of the central post 1602 shown in FIG. 16A. The distal end of the pusher rod 1600 may also include one or more tines or posts 1608 that may constrain movement of the cuff 1604. As noted above with respect to FIG. 14A and FIG. 14B and the mounting post 1406, the size of the central post 1602 may vary according to the size of the cuff and/or the inclusion or exclusion of a deployment tab.

When the cuff 1604 is loaded onto the pusher rod 1600, as illustrated in FIG. 16C, the posts 1608 may hold the cuff 1604 and protect the cuff as it is pushed through the delivery tube 1610, further illustrated in FIG. 16D. O-rings 1612, or similar devices, may be mounted in a distal block 1614 that has outer dimensions designed to form a seal between the O-rings 1612 and the interior walls of the delivery tube 1610, whereby the delivery tube 1610 is open at its distal end and sealed at a proximal end. And, as illustrated in FIG. 16C, the cuff 1604 may be positioned on the central post 1602, as illustrated in FIG. 16A, with the cuff's lead extending in a distal direction.

FIG. 16E further illustrates the delivery tube 1610 and pusher rod 1600 of the embodiment as they may be inserted into a trocar seal of trocar port 1620 outside the patient's body and into the introduction tube 1622 inside the abdominal cavity. FIG. 16F illustrates the delivery tube 1610 and pusher rod 1600 fully inserted into the trocar port 1620, such that the neural cuff 1604 is successfully delivered to the distal end of the introduction tube 1622, where it may be removed for deployment.

FIG. 17 illustrates an embodiment of a delivery tube, or a trocar cannula, that may be suitable for a round trocar port and is similar to the embodiment illustrated in FIGS. 15A, 15B, 15C and 15D. However, in this embodiment the delivery tube does not comprise a wall as in the embodiments shown in FIGS. 15A, 15B, 15C and 15D. This embodiment may be compatible with a neural cuff that does or does not include a deployment tab. The embodiment may comprise of a delivery tube (also referred to as a neural delivery device) or cannula 1700. The delivery tube 1700 may be sealed by a cap 1704. The delivery tube 1700 comprises a delivery tube retention member 1706, which is a flange to prevent the delivery tube from passing entirely through the trocar. The neural cuff 1708 may be provided at portion 1710 which is closer to a proximal end 1712 of the delivery tube 1700. The positioning of the neural interface further away from the open end allows for a distance between the open end and the neural interface to retain the neural interface in position until pulled out of the delivery tube for deployment.

Figure 18:
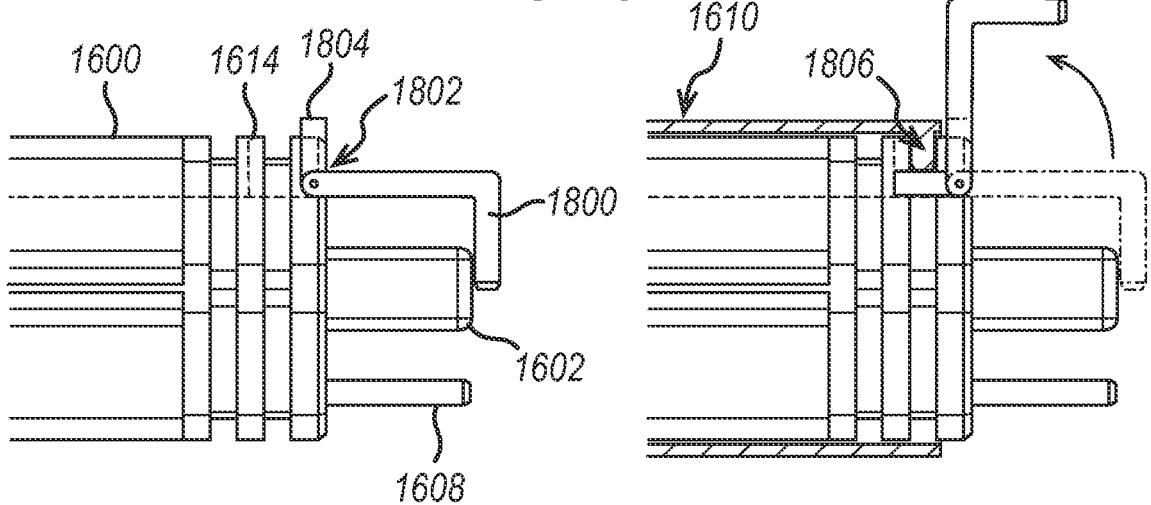
FIG. 18 is a side view of a delivery tool with a retention tool in accordance with an embodiment.

FIG. 18 illustrates an embodiment of a retention feature that may be utilized in any of the embodiments above, i.e., a delivery tube, deployment tube or pusher rod and with or without a mounting post or central post. In the embodiment, the retention feature may be a substantially double L-shaped or hook-shaped arm 1800 that is pivotally attached to the distal block 1614 of the pusher rod 1600. FIG. 18 illustrates the arm 1800 in a closed position (left) and open position (right). The neural cuff is not illustrated, but when mounted on the central post 1602, the arm 1800 would cover a portion of the distal end of the cuff and further constrain the cuff. The arm 1800 may be used in place of a tine or post 1608, which may still be utilized on an opposite side, but a portion of the distal block 1614 may be required to be cut out to accommodate operation of the arm 1800, as further explained below.

The arm 1800 may be pivotally attached to the distal block 1614 by a pin 1802 or similar device. When the neural cuff is still within the delivery tube 1610, the inside walls of the delivery tube 1610 may force the arm 1800 into a substantially closed position. When the neural cuff approaches the end of the delivery tube 1610, a second extending portion 1804 (in the reverse direction of the first extending portion) at the other end of the arm 1800 may engage a release feature 1806 extending from an inside wall of the delivery tube 1610, thereby forcing the arm 1800 to pivot away from the cuff.

Figure 19A:
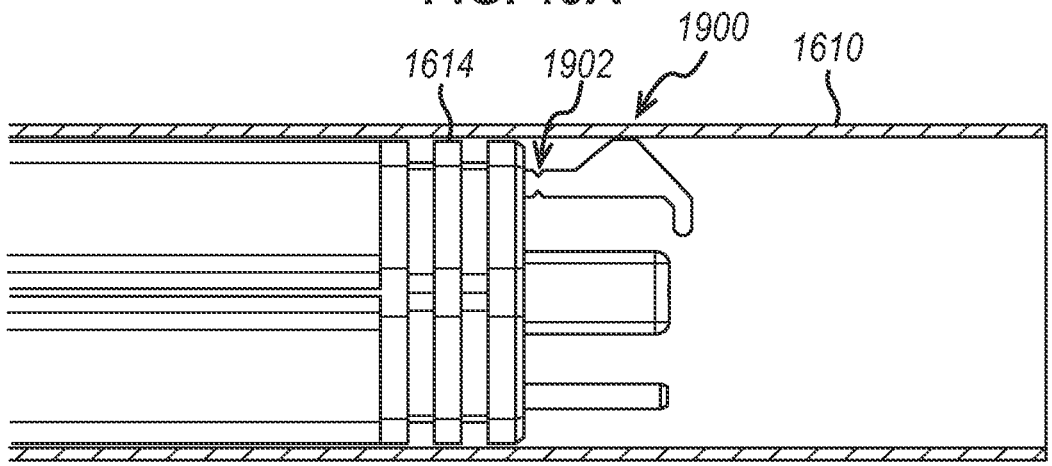
FIG. 19A is a side view of a delivery tool with a retention tool in an unreleased position in accordance with an embodiment.
Figure 19B:
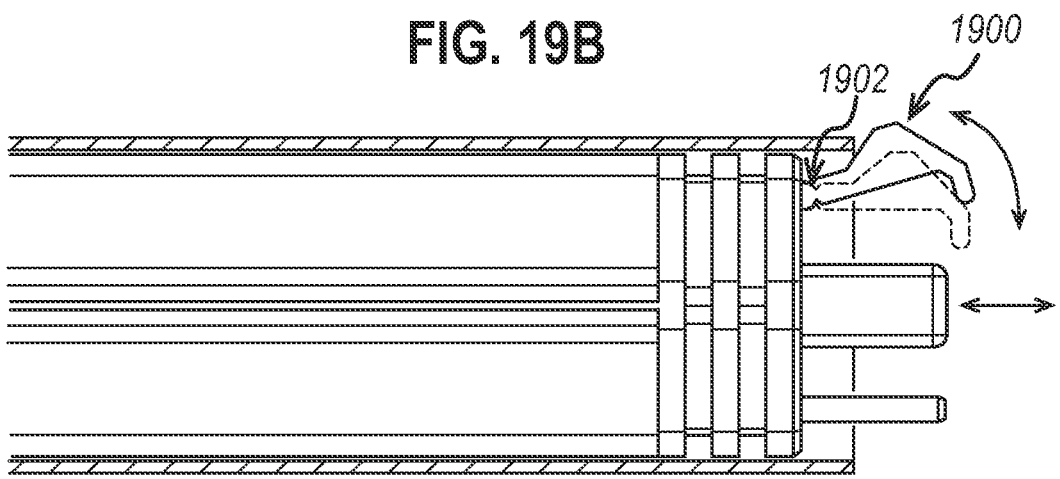
FIG. 19B is a side view of a delivery tool with a retention tool in a released position in accordance with an embodiment.

FIGS. 19A and 19B illustrate another embodiment of a retention feature 1900, that may be similarly pivotally attached to the distal block 1614. Rather than cut out a portion of the distal block 1614, the retention feature 1900 may be molded at the position of a tine or post 1608 in an open position, as illustrated in FIG. 19B. A base 1902 of the retention feature 1900 may be thinned out so as to make the base flexible. When the retention feature 1900 is within the delivery tube 1610, the retention feature may be forced into a closed position by an extended portion. When the retention feature 1900 exits the distal end of the delivery tube 1610, the retention feature would self-pivot to its biased open position when the extended portion is no longer forced by the delivery tube 1610.

FIGS. 21A and 21B are perspective cross-section views of different sides of a neural interface retention feature of a trocar cannula or delivery tube in accordance with an embodiment. The cannula 2100 includes a sealed or an introduction end 2102 and an open or delivery end 2104. The introduction end 2102 is proximate to the trocar port (not shown) when in use and the delivery end 2104 is distal to the trocar port when in use. This relationship is more clearly illustrated in FIG. 22A, which is a cross-section view of the entire trocar cannula 2100, FIG. 22B, which provides an external view of the entire trocar cannula 2100

The introduction end 2102 may include two concentric rings, the smaller of which forms the retention feature band 2106 and includes a series of flexible fins 2108. The flexible fins 2108 are triangular or tooth-shaped, with the wider ends attached to the inner wall of the retention feature band 2106 and the narrower ends extending toward the center of the retention feature band 2106. The narrower ends of the flexible fins 2108 do not contact one another and therefore leave a circular opening in the middle of the retention feature band 2106. The flexible fins 2108 are evenly spaced around the inner wall of the retention feature band, except between two of the flexible fins a larger space is created to enable the lead of a neural interface to pass through. The flexible fins 2108 are configured to hold the neural interface in a stable centered position prior to being pulled (by the lead body of the neural interface) further down the cannula 2100 toward the delivery end 2104. The retention feature may be configured to help hold the neural interface in an aligned position as it is inserted into the delivery tube and moved along the delivery tube towards the opening and to reducing contact between the neural interface and the inside surfaces of the delivery tube.

Figure 23A:
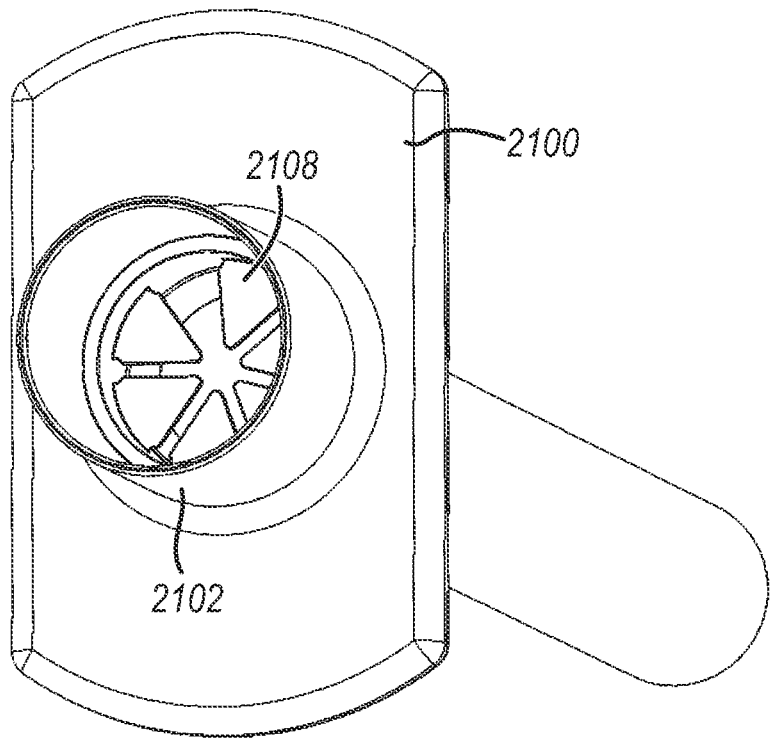
FIG. 23A is a perspective view of a proximal end of the trocar cannula of FIG. 21A.
Figure 23B:
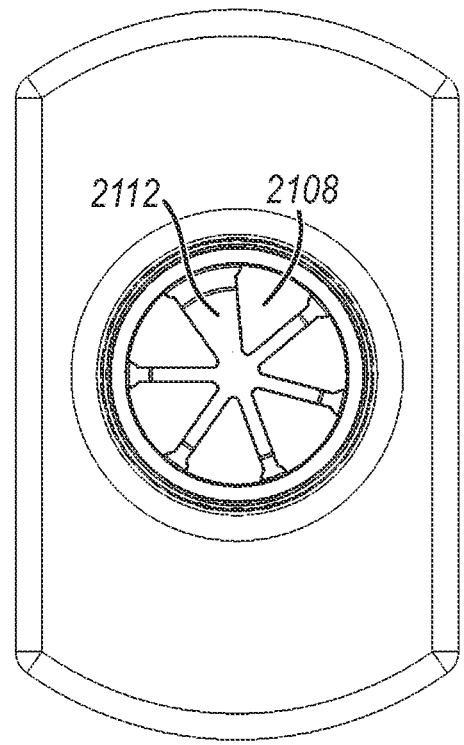
FIG. 23B is an end view of the proximal end of the trocar cannula of FIG. 23A.

The introduction end 2102 of the cannula 2100 may also include a flange 2110 that is configured to prevent the cannula from slipping all of the way through the trocar port when in use. The introduction end 2102 of the cannula may have a larger radius than the delivery end 2104 and may taper from the larger radius to the smaller radius near the location of the flange 2110. The tapered area 2112 may include a flat seat 2114 on which the retention feature band 2106 may be positioned and held in place FIG. 23A and FIG. 23B provide a perspective view and an end view, respectively, of a proximal end of the trocar cannula of FIG. 21A and better illustrate the arrangement of the flexible fins 2108. As most visible in FIG. 23B the six fins may be mostly evenly spaced except for between two of the fins which have a wider gap 2112 between them to accommodate the neural interface lead.

Figure 24A:
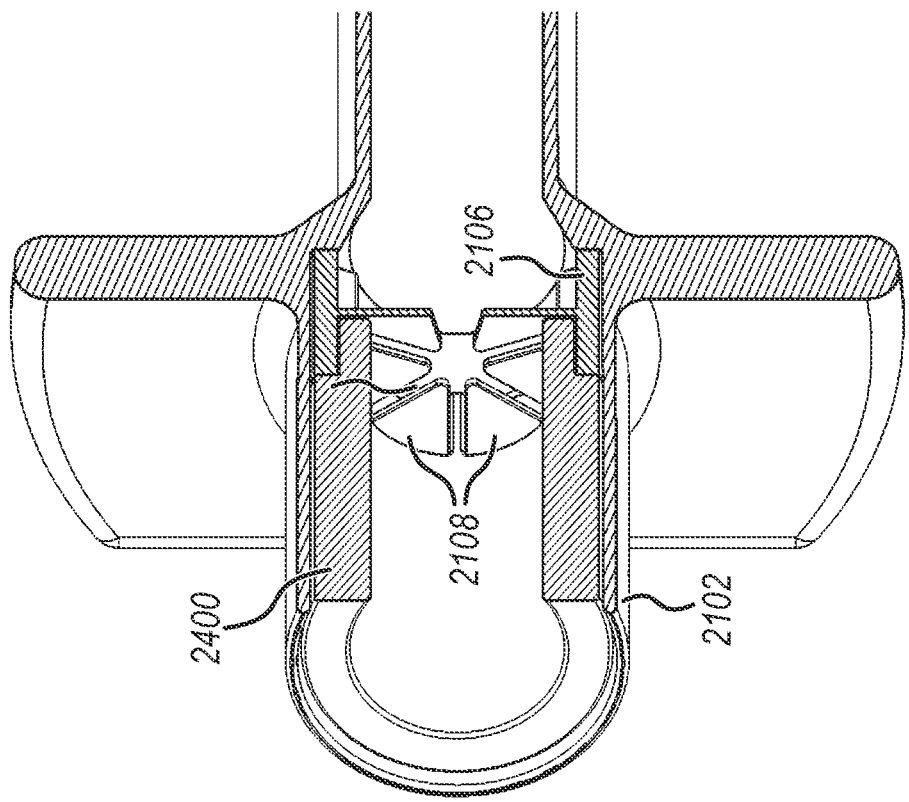
FIG. 24A is a perspective cross-section view toward a proximal end of a trocar cannula including a retention feature and a guide member.
Figure 24B:
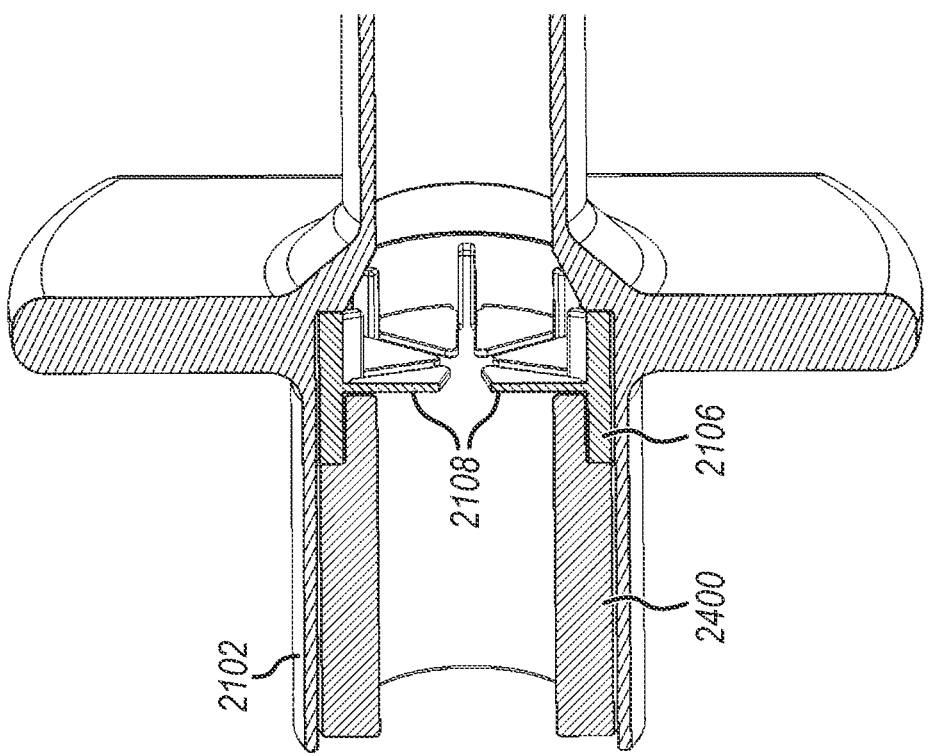
FIG. 24B is a perspective cross-section view of a proximal end of the trocar Cannula of FIG. 24A.

FIG. 24A and FIG. 24B include two different perspective cross-section views toward the introduction end of the trocar cannula described above in FIGS. 21A-23B and further including a guide member 2400. The guide member 2400 may be a further concentric ring or band that fits within the interior of the introduction end 2102 of the cannula and may be configured to further reduce the radius of the introduction end so that the neural interface is snuggly guided to and through the flexible fins 2108.

A further embodiment of a retention feature 2500 is illustrated in FIG. 25A, which provides a perspective view of a neural interface retention feature. An end view of retention feature 2500 is shown in FIG. 25B. Retention feature 2500 may be a concentric band that fits within the introduction end 2102 of the cannula, but include only two flexible fins 2502, versus the six flexible fins 2108. The two fins 2502 may be separated at their narrower ends 2504 toward the center of the introduction end by a gap that expands into more of a rectangular area 2406 toward the interior wall. The rectangular area may be configured to accommodate the lead for the neural interface.

EXEMPLARY EMBODIMENTS

The following list of embodiments also forms part of the present disclosure:

Embodiment 1: A deployment tab for deploying a neural interface device comprising a first area configured to be positioned near the neural interface, and a connector, for releasably coupling the first area to the neural interface, anchored to the first area.

Embodiment 2: The deployment tab of embodiment 1, wherein the deployment tab comprises a planar shape.

Embodiment 3: The deployment tab of embodiment 1 or 2, wherein the deployment tab comprises at least in part a triangular shape.

Embodiment 4: The deployment tab of any preceding embodiment, further comprising a second area, and a central area between the first area and the second area.

Embodiment 5: The deployment tab of embodiment 4, wherein the first area is wider than the second area.

Embodiment 6: The deployment tab of any preceding embodiment, wherein a cut through the deployment tab releases at least a part of the connector to enable the first area to move away from the neural interface device.

Embodiment 7: The deployment tab of any one of embodiment 4 to 6, further comprising at least one passage extending from the first area to the second area through the central area, each passage including a first opening in the first area and a second opening in the second area.

Embodiment 8: The deployment tab of embodiment 7, wherein the connector is a suture thread for passing through the at least one passage from the second opening to the first opening and for holding the first area near the implantable device, and anchored to the first area.

Embodiment 9: The deployment tab of embodiment 7 or 8, comprising a cuttable portion extending across the at least one passage and configured to release at least one portion of the connector within the at least one passage when the cuttable portion is cut through, wherein the release of the at least one portion of the suture thread enables the first area to move away from the implantable device.

Embodiment 10: The deployment tab of any one of embodiments 7 to 9, wherein the connector includes a first portion that passes through the at least one passage from the second opening to the first opening, wherein the connector includes a second portion that is removably attached to the implantable device, wherein the connector includes a third portion that passes through the at least one passage from the first opening to the second opening, and wherein the first portion is connected to the second portion and the second portion is connected to the third portion.

Embodiment 11: The deployment tab of any one of embodiments 7 to 10, wherein the at least one passage includes a first passage and a second passage, wherein the first portion passes through the first passage, the third portion passes through the second passage.

Embodiment 12: The deployment tab of any one of embodiments 4 to 11, wherein at least the first area and the second area include rounded edges.

Embodiment 13: The deployment tab of any one of embodiments 9 to 12, wherein the cuttable portion is a depressed area in the central area that extends across at least the first passage and the second passage.

Embodiment 14: The deployment tab of embodiment 13, wherein the depressed area in the central area extends only across a portion of width of the central area so that at least a portion of the central area is not cut into two pieces when the depressed area is cut through to release the connector.

Embodiment 15: The deployment tab of embodiment 13, wherein the depressed area extends across a whole width of the central area so that the central area is cut into two pieces when the depressed area is cut through to release the connector.

Embodiment 16: The deployment tab of any one of embodiments 4 to 15, wherein at least the central area includes a series of alternating lateral ridges and lateral valleys that extend across a width of the central area, for providing longitudinal flexibility that enables the deployment tab to be rolled up while providing lateral stiffness when the deployment tab is unrolled.

Embodiment 17: The deployment tab of any one of embodiments 4 to 16, wherein the first area and the second area include the alternating lateral ridges and lateral valleys that extend across a width of the first area and a width of the second area.

Embodiment 18: The deployment tab of embodiment 16 or 17, wherein the at least one passage is formed by a tunnel through each lateral ridge and a tube across each lateral valley.

Embodiment 19: The deployment tab of any one of embodiments 9 to 18, wherein the cuttable portion is a lateral valley.

Embodiment 20: The deployment tab of any preceding embodiment, wherein the connector is anchored to the first area by being molded into the first area.

Embodiment 21: The deployment tab of any preceding embodiment, wherein the connector is anchored to the first area by adhesive.

Embodiment 22: The deployment tab of any one of embodiments 4 to 21, wherein the first area, the second area and the central area are molded from silicone.

Embodiment 23: The deployment tab of any one of embodiments 7 to 22, wherein at least the second area is tapered toward the second opening.

Embodiment 24: The deployment tab of embodiment 23, wherein the tapered second area includes a gripping point for manipulation.

Embodiment 25: The deployment tab of embodiment 24, wherein the gripping point includes an opening.

Embodiment 26: The deployment tab of any preceding embodiment, wherein the tab includes a first surface and a second surface opposite the first surface, the first surface providing an indication of the location of the cuttable portion, the second surface including a plurality of longitudinal grooves along a length of the deployment tab for reduced contact.

Embodiment 27: The deployment tab of embodiment 26, wherein at least the second area and the central area are tapered, wherein a first portion of the plurality of longitudinal grooves extend from the first area to the second area through the central area and a second portion of the plurality of longitudinal grooves extend from the first area to the central area.

Embodiment 28: The deployment tab of any one of embodiments 4 to 27, wherein the second area tapers in its thickness from an edge of the second area towards the central area.

Embodiment 29: The deployment tab of embodiment 28, wherein the thickness increases from the edge of the second area towards the central area.

Embodiment 30: The deployment tab of any one of embodiments 4 to 27, wherein the second area comprises a rounded edge.

Embodiment 31: A system comprising a deployment tab according to any preceding claim, and a neural interface comprising a cuff portion for being placed at least partially around a target.

Embodiment 32: The system of embodiment 31, wherein an opening portion of the neural interface is configured to be removably coupled to the deployment tab.

Embodiment 33: The system of embodiment 31 or 32, wherein the cuff portion comprises a spine and at least two curved arms extending from the spine and comprising electrodes, wherein each open end of the curved arm is removably coupled to the deployment tab.

Embodiment 34: The system of any one of embodiments 31 to 33, wherein cuff portion comprises a first arm for being moved in a first direction and one or more second arms for being moved in a second direction substantially opposite the first direction, and wherein the second portion of the connector is removably attached to the one or more second arms.

Embodiment 35: The system of embodiment 34, wherein the one or more second arms include two arms positioned on opposite sides of the first arm, one arm among the two arms aligned with the first opening of the first passage and the other arm among the two arms aligned with the first opening of the second passage.

Embodiment 36: The system of any one of embodiments 31 to 35, wherein the one or more second arms include a first eyelet and the other arm includes a second eyelet, and wherein the second portion of the connector is removably attached to the cuff by passing through the first eyelet and the second eyelet so as to hold the first area near the cuff until at least one of the first portion or the third portion is cut through at the cuttable portion so that the second portion of the connector can be pulled away from the cuff.

Embodiment 37: The system of any one of embodiments 31 to 35, wherein a thickness of the central area of the tab is equal or larger than a thickness of the neural interface.

Embodiment 38: The system of any one of embodiments 34 to 37, wherein the one or more second arms have an arm height in a direction perpendicular to both a width and length of the tab, wherein the central area has a height that runs substantially parallel to the arm height, and wherein the height of the central area is greater than the arm height.

Embodiment 39: The system of any one of embodiments 31 to 35, wherein a width of the first area of the tab is equal or larger than a width of the neural interface.

Embodiment 40: The system of any one of embodiments 34 to 39, wherein the cuff has a width measured from an outer side of the one arm to an outer side of the other arm and that runs substantially parallel to the width of the first area, and wherein the width of the first area is greater than a width of the cuff.

Embodiment 41: The system of any one of embodiments 31 to 40, wherein the deployment tab is configurable as a measurement tool for measuring a fit of the neural interface to a target.

Embodiment 42: The system of any one of embodiment 41, wherein a measurement of a fit is determined based on a distance between the ridges or grooves or valleys of the deployment tab.

Embodiment 43: The system of embodiments 41 or 42, wherein a measurement of a fit is determined based on a distance between a first portion of the deployment tab and a second portion of the deployment tab.

Therefore, a deployment tab for a neural cuff may be provided with a thickness and/or width slightly larger than the thickness and/or width of the neural cuff. The deployment tab may include an anchored suture that is wound through the deployment tab and removably attached to the neural cuff. A cut through at least a portion of the deployment tab may completely detach the deployment tool from the neural cuff. The deployment tab may include a series of transverse (or lateral, along a width of the deployment tab) ridges and valleys on one side, which may serve as a cut through guide and may enable the deployment tab to be rolled into a small size for delivery. The deployment tab may include a series of longitudinal ridges and valleys on the opposite side, which may serve to minimize contact surfaces (including when the deployment tab is rolled up). The deployment tab may include a tapered proximal end and be configured to operate as an instrument to check the dissection opening is large enough for the cuff (e.g. a go/no-go gauge) as well as a blunt dissection tool. In other words, the deployment tab may be configured to provide repeatable blunt dissections around the target, for example a neurovascular bundle. The blunt dissections may be non-damaging to nerve fascicles. For example, at least one of: the various different shapes of the deployment tab (substantially triangular or tapering/changing width); rounded edges or corners of the deployment tab; and/or the tapering thickness of the deployment tab, may assist in the deployment tab function as a blunt dissection tool. If a thickness and/or width of the deployment tab will not fit through the dissection, a slightly smaller neural cuff may not fit. The anchored suture is positioned within the deployment tab so that when at least a portion of the deployment tab is cut through, the suture is cut, thereby releasing the deployment tab from the pre-attached portion of the neural cuff.

Further, the deployment tab may be configured to keep the arms of the releasably attached neural interface parallel, particularly during deployment. Further still, the deployment tab being releasably connected to the neural interface in at least two locations (for example around a first opening of a first passage in a first area of the deployment tab and around a first opening of a second passage in the first area of the deployment tab, where a connector is configured to pass through the passages). Thus, the deployment tab may prevent arms of the releasably attached neural interface from crossing over when they are passed under the neurovascular bundle during deployment. In other words, the deployment tab may be configured to maintain a portion of the neural interface coupled to the first area parallel to an edge of the first area. The deployment tab may be configured to maintain portions of the neural interface coupled to the first area a predetermined distance apart from each other. The predetermined distance may be at least a part of a width of the first area of the deployment tab. The predetermined distance may be a distance between a first opening of a first passage and a first opening of a second passage.

A deployment tab for a neural cuff may comprise a thickness and width slightly larger than the thickness and length of the neural cuff. The deployment tab includes an anchored suture that is wound through the deployment tab and removably attached to the neural cuff such that a cut through a portion of the deployment tab may completely detach the deployment tool from the neural cuff. The deployment tab may include a tapered proximal end and be configured to operate as a go/no-go gauge. If a thickness and width of the deployment tab will not fit through the dissection, a slightly smaller neural cuff may not fit. The anchored suture is positioned within the deployment tab so that when n the deployment tab is cut through, the suture is cut, thereby releasing the deployment tab from the pre-attached portion of the neural cuff.

The following list of embodiments also forms part of the disclosure:

Embodiment 1: a tool or a system for delivering a neural interface device into an abdominal cavity for implantation within a patient, comprising an insertion tube for insertion through the abdominal cavity, the insertion tube having a sealed port and an open end for being positioned within the abdominal cavity when inserted, and a delivery tube for insertion through the sealed port of the insertion tube, comprising an opening at a first end for the neural interface device.

Embodiment 2: The tool or system of embodiment 1, wherein the delivery tube includes a holder near the opening at an open end for holding the neural interface device in a position at the opening of the delivery tube.

Embodiment 3: The tool or system of embodiment 1 or 2, wherein the delivery tube includes a cross-sectional wall positioned near the open end of the delivery tube, and wherein the holder is mounted on the wall.

Embodiment 4: The tool or system of embodiment 1 further comprising a pusher rod having a first end for insertion into a sealable end of the delivery tube and a second end for extending out of the sealable end of the delivery tube, the first end including a holder for holding the neural interface device in the position.

Embodiment 5: The tool or system of embodiment 4 wherein the pusher rod includes a first flange directly below the holder and a second flange positioned a distance from the first flange along a length of the pusher rod, wherein the first flange and second flange touch the inside surface of the delivery tube and slide along the inside surface for reducing contact between the neural interface device and the inside surface.

Embodiment 6: The tool or system of embodiment 5, wherein the second flange is configured to seal the delivery tube.

Embodiment 7: The tool or system of embodiment 5 or 6, wherein the distance is sufficient to prevent the pusher rod from tilting while the delivery rod is moved from the sealable end to the open end of the delivery tube.

Embodiment 8: The tool or system of any of embodiments 5 to 7 wherein the first flange includes a cutout for accessing a suture connected to the neural interface device.

Embodiment 9: The tool or system of any of embodiments 5 to 8, wherein the holder includes a mounting post, and wherein the neural interface device is configured to be positioned around the mounting post.

Embodiment 10: The tool or system of embodiment 9, wherein the neural interface device has a central opening that enables the neural interface to be placed around a target, wherein the neural interface device is attached to a deployment tab that is rolled up within the first central opening while the neural interface device is in the delivery tube, and wherein the rolled up deployment tab is configured to be positioned around the mounting post.

Embodiment 11: The tool or system of embodiment 9 or 10, wherein the mounting post is shaped to match a shape of the neural interface device.

Embodiment 12: The tool or system of any of embodiments 9 to 11 wherein the mounting post is a central post, and wherein the holder further includes at least one side post positioned outside of the neural interface device for retaining the neural interface device while held on the mounting post.

Embodiment 13: The tool or system of embodiment 13, wherein the at least one side post is retractable and includes a release that is activated by a lack of engagement with the delivery tube.

Embodiment 14: The tool or system of embodiment 12 or 13, wherein the delivery tube includes a portion extending from the inside surface near the open end of the delivery tube, wherein the at least one side post is retractable, and wherein the portion engages the at least one side post to retract the at least one side post as the first end of the pusher rod exits the open end of the delivery tube.

Embodiment 15: The tool or system of any of embodiments 4 to 14, wherein the pusher rod includes a block positioned near the first end, and wherein the block includes one or more O-rings to seal the delivery tube.

Embodiment 16: The tool or system of any of embodiments 4 to 15, wherein the delivery tube and the pusher rod have circular cross-sections.

Embodiment 17: The tool or system of any one of embodiments 4 to 16, wherein the delivery tube and the pusher rod have non-circular cross-sections.

Embodiment 18: The tool or system of embodiment 17, wherein the non-circular cross-sections are one of an obround shape, an oval shape, a square shape, a rectangular shape, and a polygonal shape.

Embodiment 19: The tool or system of any preceding embodiment, wherein the sealable end of the delivery tube includes a retention feature.

Embodiment 20: The tool or system of embodiment 19, wherein the retention feature includes a band positioned within the delivery tube, the band including a plurality of flexible fins extending from an inner wall of the band, the plurality of flexible fins being configured to retain an alignment of the neural interface device when inserted into the delivery tube.

Embodiment 21: The tool or system of embodiment 20, wherein each of the plurality of flexible fins are triangular or tooth-shaped with a wider end attached to the inner wall of the band and a narrower end extending toward a center of the band.

Embodiment 22: The tool or system of embodiment 21, wherein the plurality of flexible fins are evenly spaced around the inner wall of the band except between two of the flexible fins where a larger space enables the lead of the neural interface device to pass through.

Embodiment 23: The tool or system of any of embodiments 19 to 22, wherein the sealable end of the delivery tube further includes a guide member configured to reduce an internal diameter of the delivery tube before the neural interface device passes through the retention feature.

Embodiment 24: The tool or system of any preceding embodiment, wherein the delivery tube is formed of stainless steel.

Embodiment 25: The tool or system of any preceding embodiment, wherein the opening at the first end of the delivery tube is a hole formed in a solid delivery tube, wherein an axis of the hole corresponds an axis of the solid delivery tube.

Embodiment 26: The tool or system of any preceding embodiment, wherein the delivery tube comprises a delivery tube retention feature configured to prevent the delivery tube from passing through the insertion tube by more than a predetermined amount.

Embodiment 27: The tool or system of any preceding embodiment, wherein the delivery tube comprises a second end where a hole passing through the delivery tube in a direction perpendicular to a length of the delivery tube.

Embodiment 28: The tool or system of any one of embodiments 2 to 27, wherein the holder is provided by friction between an inner surface of the opening of the delivery tube and a neural interface device.

Embodiment 29: The tool or system of any one of embodiments 2 to 28, wherein the holder is provided as an interference fit with the neural interface device to be delivered.

A delivery tool may include a tube having an open distal end and a sealed proximal end, the tube being configured for insertion into a sealed port (in other words sealable port) and introduction tube of a trocar port. The delivery tool may also include a retention mechanism positioned within the tube for holding the neural interface with its lead extending toward the distal end of the tube and an outer diameter of the neural interface being mounted on or within a holder smaller than an inner diameter of the tube. The retention mechanism may hold the neural interface, so the neural interface remains aligned inside the tube to manage and/or prevent excess amount of friction and/or early release. In an embodiment, the retention mechanism may be positioned at the end of a delivery tool. In another embodiment the retention mechanism may be configured to move the neural interface from an end of the tube proximal to the operator to an end of the tube distal to the operator from which the neural interface can be removed for deployment around one or more nerves.

The embodiments of the present disclosure, while illustrated and described in terms of various embodiments, is not limited to the particular description contained in this specification. Additional alternative or equivalent components and elements may be readily used to practice the present disclosure.

The invention claimed is:

1. A deployment tab for deploying a neural interface device, the deployment tab comprising:
    a first area or portion configured, in use, to be positioned proximal to the neural interface device;
    a connector, for releasably coupling the first area or portion to the neural interface device, the connector being anchored to the first area or portion, and
    a first, top surface and a second, bottom surface opposite the first surface, the first surface providing an indication of a location of a cuttable or breakable portion, the second surface including a plurality of longitudinal grooves along a length of the deployment tab for reduced contact.

2. The deployment tab of claim 1, wherein the deployment tab comprises at least in part, or consists of, a planar shape.

3. The deployment tab of claim 1, wherein the deployment tab comprises at least in part, or consists of, a triangular, tapered and/or trapezoidal shape.

4. The deployment tab of claim 1, further comprising:
    a second area or portion configured, in use, to be positioned proximal from the first area or portion; and
    a central area or portion between the first area or portion and the second area or portion.

5. The deployment tab of claim 4, wherein the first area or portion is wider than the second area or portion.

6. The deployment tab of claim 1, wherein the deployment tab is configured such that, in use when the deployment tab is cut, at least a part of the connector is released from its coupling to the first area or portion to enable the first area or portion to be moved away from the neural interface device.

7. The deployment tab of claim 4, further comprising:
    at least one passage extending from the first area or portion to the second area or portion through the central area or portion, each passage including a first opening in the first area or portion and a second opening in the second area or portion.

8. The deployment tab of claim 7, wherein the connector includes a first connector portion that passes through the at least one passage from the second opening to the first opening, wherein the connector includes a second connector portion that is removably attached to an implantable device, wherein the connector includes a third connector portion that passes through the at least one passage from the first opening to the second opening, and wherein the first connector portion is connected to the second connector portion and the second connector portion is connected to the third connector portion.

9. The deployment tab of claim 8, wherein the at least one passage includes a first passage and a second passage, wherein the first connector portion passes through the first passage, the third connector portion passes through the second passage.

10. The deployment tab of claim 7, wherein the connector is a suture thread passing through the at least one passage from the second opening to the first opening, the suture thread anchored to the first area or portion proximal to an implantable device for holding the first area or portion.

11. The deployment tab of claim 7, comprising
    a cuttable or breakable portion extending across the at least one passage, wherein the cuttable or breakable portion is configured, when cut through, to separate a portion of the connector within the at least one passage proximal to the cuttable or breakable portion from another portion of the connector distal to the cuttable or breakable portion, and wherein the separation of the portion of the connector enables the deployment tab to separate from an implantable device.

12. The deployment tab of claim 7, wherein at least the second area or portion is tapered proximally, in the direction of the second opening.

13. The deployment tab of claim 4, wherein at least the second area or portion and the central area or portion are tapered, wherein a first portion of the plurality of longitudinal grooves extend from the first area or portion to the second area or portion through the central area or portion and a second portion of the plurality of longitudinal grooves extend from the first area or portion to the central area or portion.

14. The deployment tab of claim 4, wherein the second area or portion tapers in its thickness from a proximal edge of the second area or portion towards the central area or portion.

15. The deployment tab of claim 7, wherein the at least one passage is an enclosed passage.

16. The deployment tab of claim 1, wherein the deployment tab is configured to function as a blunt dissection tool.

17. A deployment tab for deploying a neural interface device, the deployment tab comprising:
- a first area or portion configured, in use, to be positioned proximal to the neural interface device;
- a connector, for releasably coupling the first area or portion to the neural interface device, the connector being anchored to the first area or portion;
- a second area or portion configured, in use, to be positioned proximal from the first area or portion; and
- a central area or portion between the first area or portion and the second area or portion, wherein at least the central area or portion includes a series of alternating lateral ridges and lateral valleys that extend across a width of the central area or portion, wherein the lateral ridges and lateral valleys are configured to provide lateral stiffness when the deployment tab is unrolled and provide longitudinal flexibility for rolling up of the deployment tab.

18. A deployment tab for deploying a neural interface device, the deployment tab comprising:
- a first area or portion configured, in use, to be positioned proximal to the neural interface device;
- a connector, for releasably coupling the first area or portion to the neural interface device, the connector being anchored to the first area or portion;
- a second area or portion configured, in use, to be positioned proximal from the first area or portion; and
- a central area or portion between the first area or portion and the second area or portion;
- wherein the first area or portion and the second area or portion include a series of alternating lateral ridges and lateral valleys that extend across a width of the first area or portion and a width of the second area or portion.

19. A deployment tab for deploying a neural interface device, the deployment tab comprising:
- a first area or portion configured, in use, to be positioned proximal to the neural interface device;
- a connector, for releasably coupling the first area or portion to the neural interface device, the connector being anchored to the first area or portion;
- a second area or portion configured, in use, to be positioned proximal from the first area or portion;
- a central area or portion between the first area or portion and the second area or portion;
- at least one passage extending from the first area or portion to the second area or portion through the central area or portion, each passage including a first opening in the first area or portion and a second opening in the second area or portion; and
- a cuttable or breakable portion which is a lateral valley.

20. The deployment tab of claim 19, wherein the at least one passage is an enclosed passage.

21. A system comprising:
- a deployment tab according to claim 1; and
- a neural interface device comprising a cuff portion for being placed at least partially around a target.

22. The system of claim 21, wherein an opening portion of the neural interface device is configured to be removably coupled to the deployment tab.

23. The system of claim 21, wherein a thickness of the central area or portion of the deployment tab is equal or larger than a thickness of the neural interface device.

24. The system of claim 21, wherein a width of the first area or portion of the deployment tab is equal or larger than a width of the neural interface device.

25. The system of claim 21, wherein the deployment tab is configurable as a measurement tool for measuring a fit of the neural interface device to a target.

26. The system of claim 21, wherein the deployment tab is rolled at least partly in the neural interface device.

* * * * *